(12) United States Patent
Nakagawa et al.

(10) Patent No.: US 12,475,672 B2
(45) Date of Patent: Nov. 18, 2025

(54) OBJECT RECOGNITION SYSTEM AND ELECTRONIC APPARATUS

(71) Applicants: SONY GROUP CORPORATION, Tokyo (JP); SONY SEMICONDUCTOR SOLUTIONS CORPORATION, Kanagawa (JP)

(72) Inventors: Kei Nakagawa, Tokyo (JP); Katsuhiko Hanzawa, Kanagawa (JP)

(73) Assignees: SONY SEMICONDUCTOR SOLUTIONS CORPORATION, Kanagawa (JP); SONY GROUP CORPORATION, Tokyo (JP)

( * ) Notice: Subject to any disclaimer, the term of this patent is extended or adjusted under 35 U.S.C. 154(b) by 518 days.

(21) Appl. No.: 17/916,924

(22) PCT Filed: Mar. 30, 2021

(86) PCT No.: PCT/JP2021/013696
§ 371 (c)(1),
(2) Date: Oct. 4, 2022

(87) PCT Pub. No.: WO2021/210389
PCT Pub. Date: Oct. 21, 2021

(65) Prior Publication Data
US 2023/0154135 A1   May 18, 2023

(30) Foreign Application Priority Data
Apr. 14, 2020   (JP) .................. 2020-072261

(51) Int. Cl.
*G06V 10/25*     (2022.01)
*G06V 20/40*     (2022.01)
*H04N 25/47*     (2023.01)

(52) U.S. Cl.
CPC .............. *G06V 10/25* (2022.01); *G06V 20/44* (2022.01); *H04N 25/47* (2023.01)

(58) Field of Classification Search
CPC ......... G06V 10/25; G06V 20/44; H04N 25/47
See application file for complete search history.

(56) References Cited

U.S. PATENT DOCUMENTS 10,345,447 B1 * 7/2019 Hicks ..................... G01S 17/86
2016/0096477 A1   4/2016 Biemer
(Continued)

FOREIGN PATENT DOCUMENTS

| EP | 3543898 A1 | 9/2019 | |
|----|------------|--------|---|
| JP | 2020-505801 A | 2/2020 | |
| WO | WO-2019135411 A1 * | 7/2019 | ............. H04N 5/345 |

OTHER PUBLICATIONS

Wang et al, "Temporal Pulses Driven Spiking Neural Network for Fast Object Recognition in Autonomous Driving" (published at Pan et al, U.S. Publication No. 2022/0180619 in view of, Jan. 2020).*
(Continued)

*Primary Examiner* — Casey L Kretzer
(74) *Attorney, Agent, or Firm* — CHIP LAW GROUP

(57) ABSTRACT

An object recognition system according to an embodiment of the present disclosure includes an event detection sensor that detects, as an event, that a change in luminance of a pixel has exceeded a predetermined threshold, and a spiking neural network. The spiking neural network executes recognition processing on an object to be recognized on a basis of a result of the detection by the event detection sensor.

10 Claims, 30 Drawing Sheets

(56) References Cited

U.S. PATENT DOCUMENTS

2017/0084044 A1    3/2017  Keh et al.
2019/0007678 A1*   1/2019  Perez-Ramirez .... H04N 19/172
2019/0364237 A1*  11/2019  Yeo ........................ H04N 25/77
2022/0180619 A1*   6/2022  Pan ........................ G06N 3/049

OTHER PUBLICATIONS

International Search Report and Written Opinion of PCT Application No. PCT/JP2021/013696, issued on May 18, 2021, 14 pages of ISRWO.
Paulun, et al., "A Retinotopic Spiking Neural Network System for Accurate Recognition of Moving Objects Using NeuCube and Dynamic Vision Sensors", Frontiers in Computational Neuroscience, vol. 12, No. 42, Jun. 12, 2018, pp. 1-13.

* cited by examiner

[FIG. 1A]
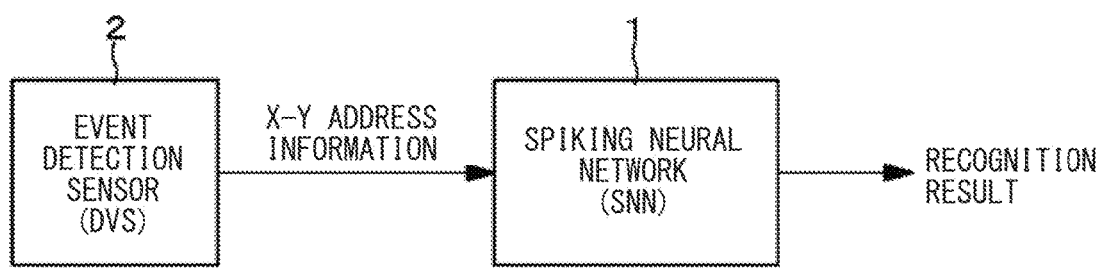
[FIG. 1B]
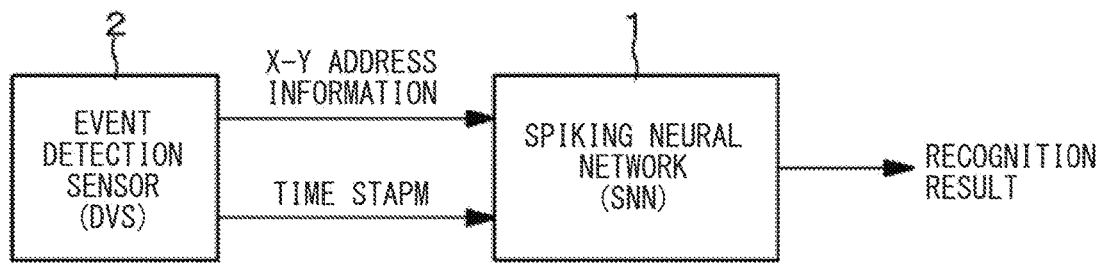

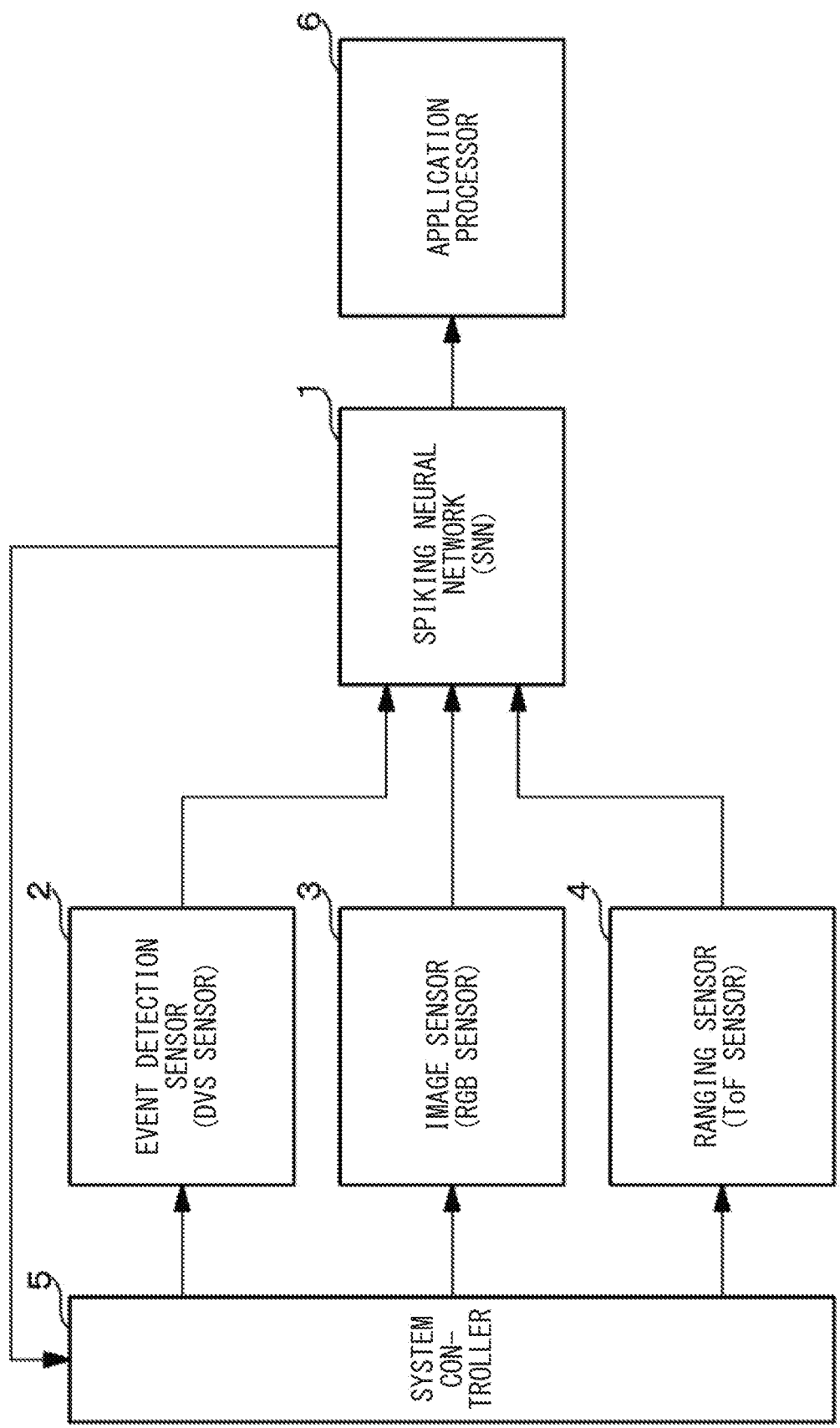
[FIG. 2]

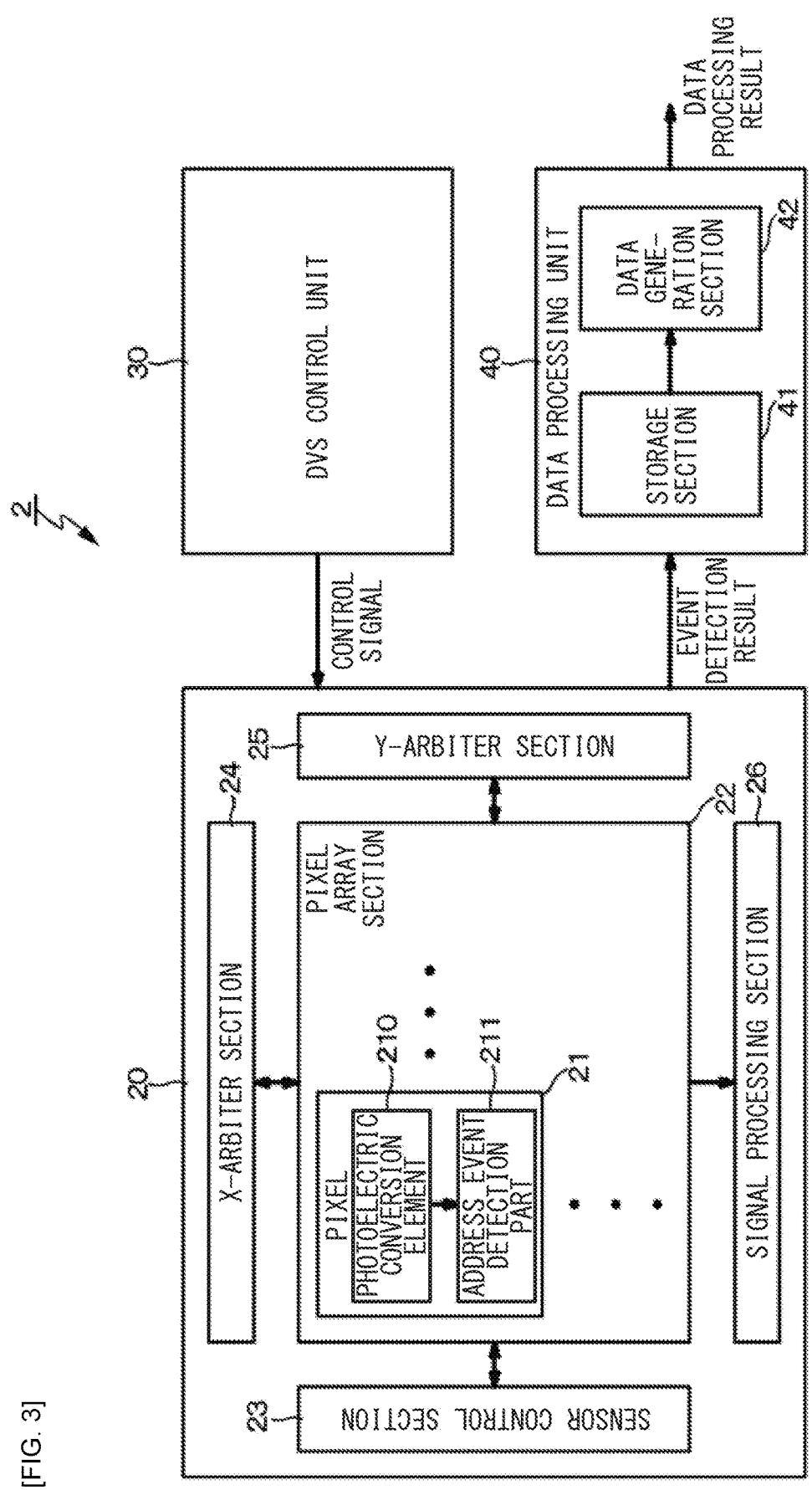
[FIG. 3]

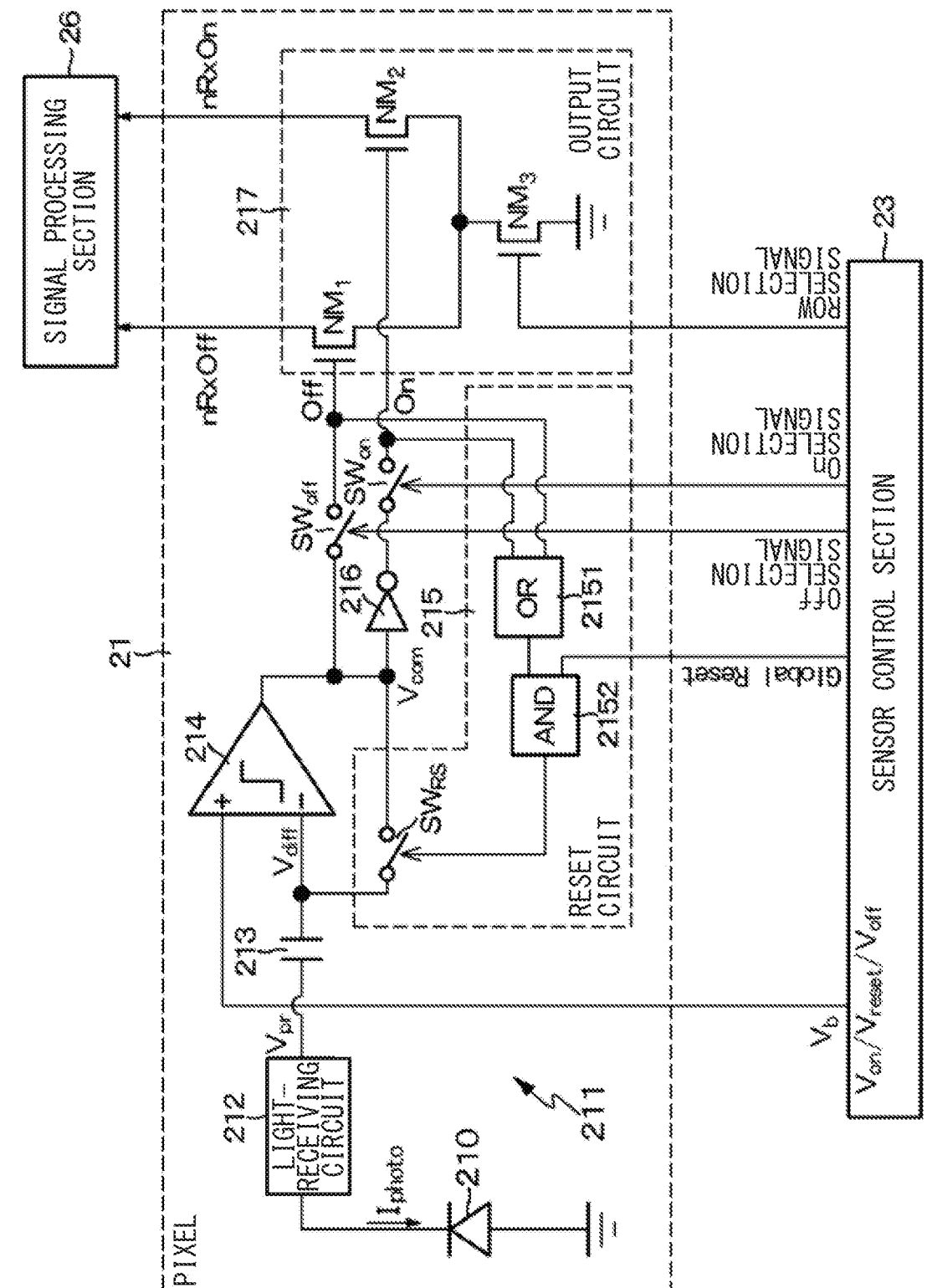
[FIG. 4]

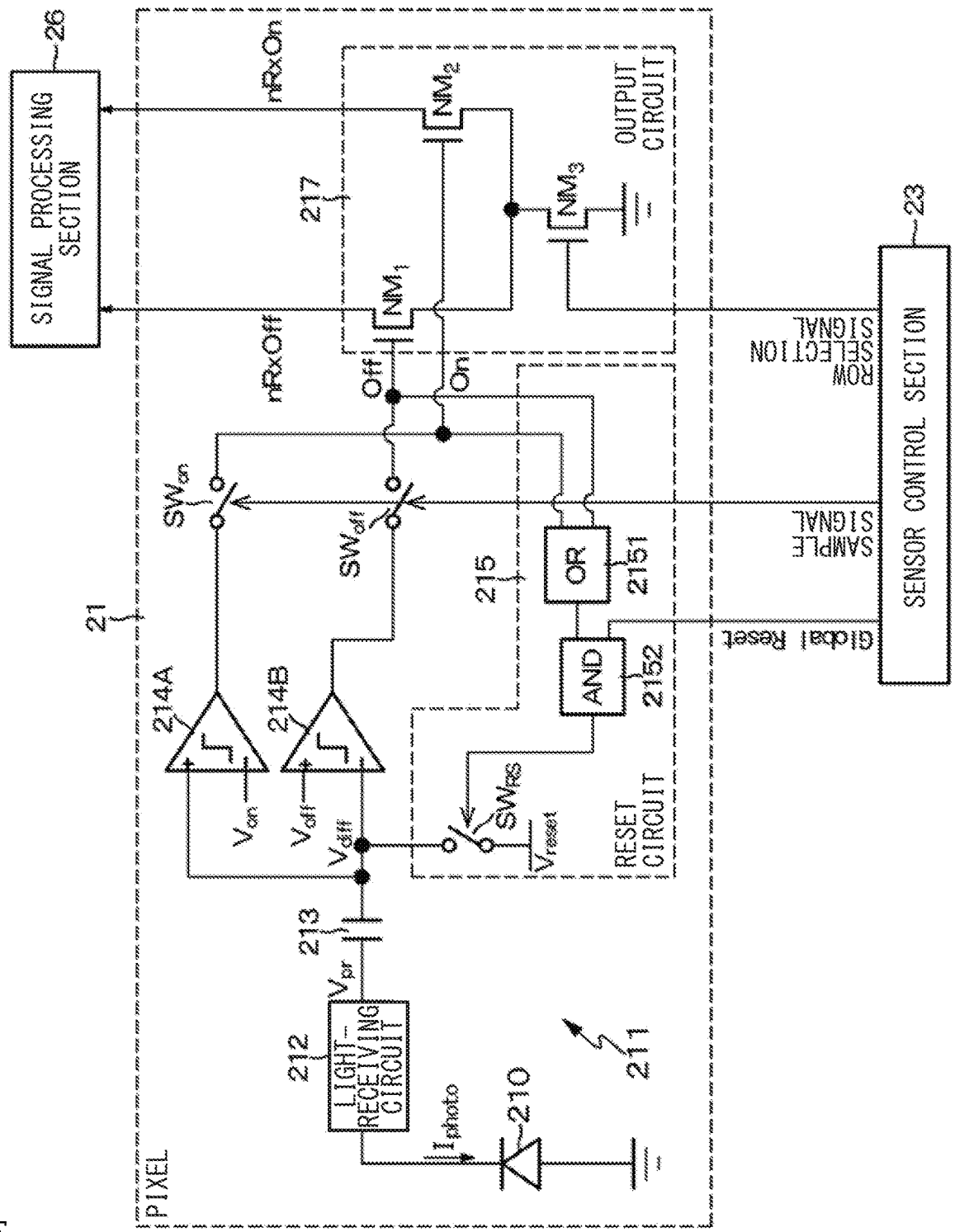
[FIG. 5]

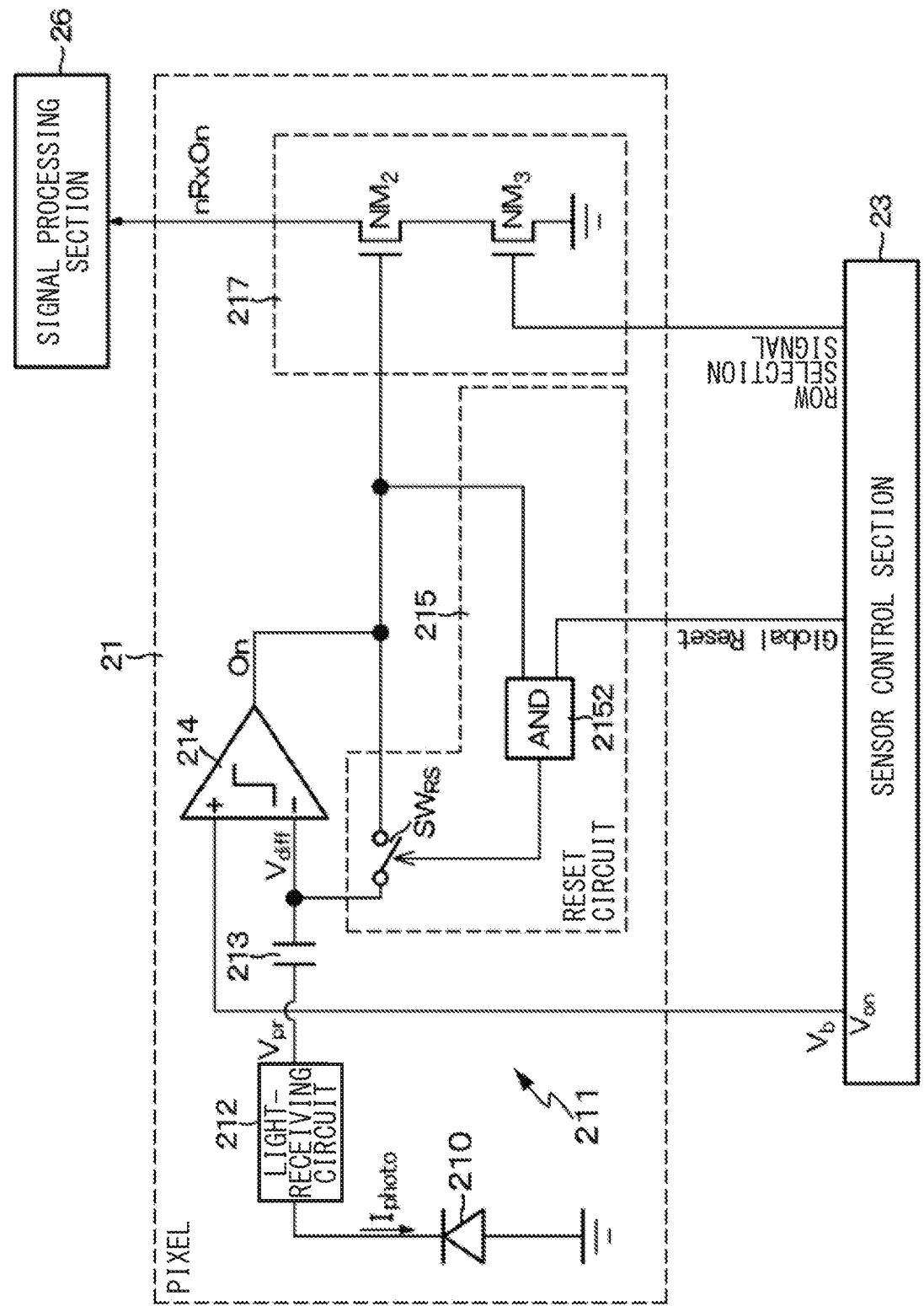
[FIG. 6]

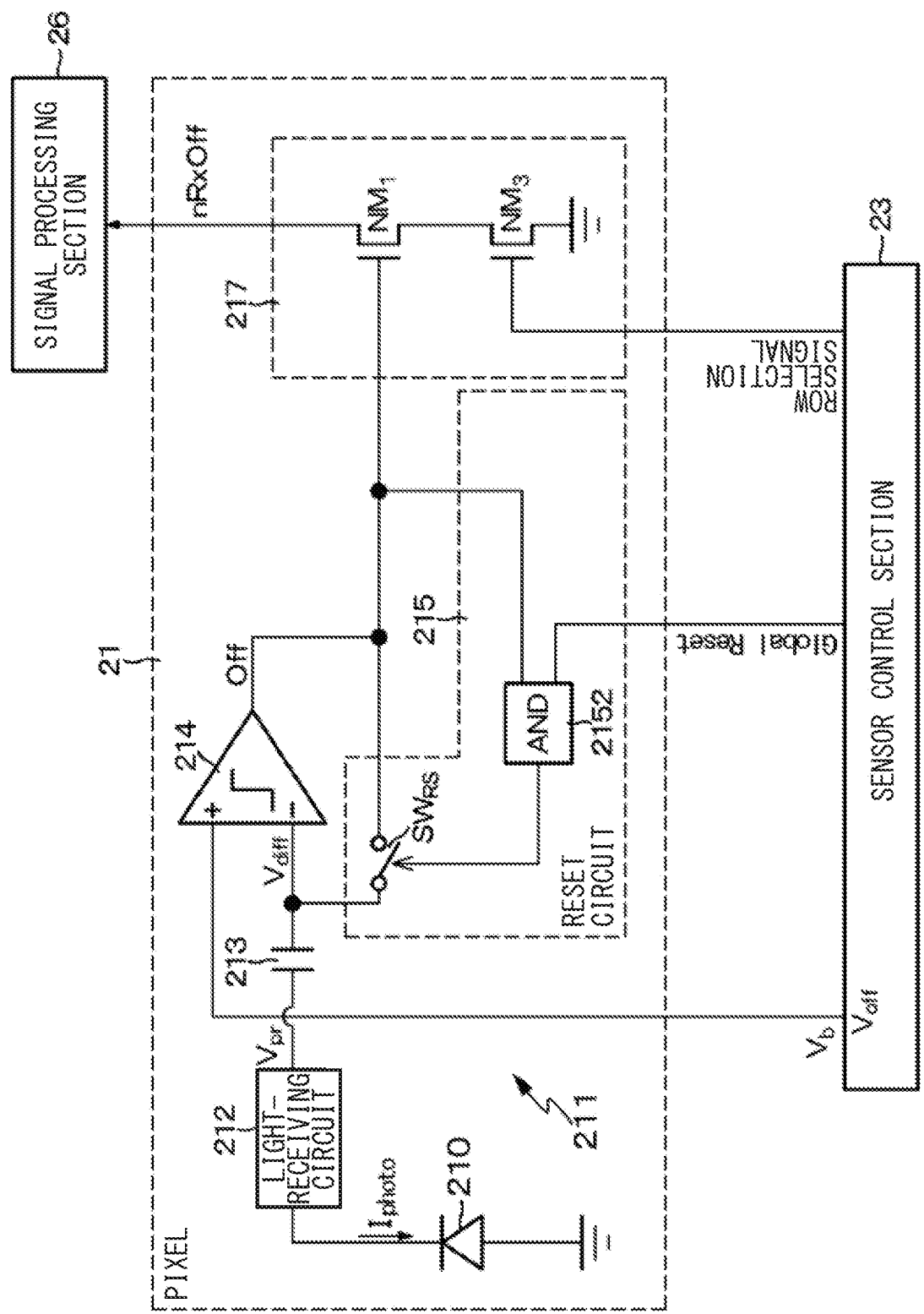
[FIG. 7]

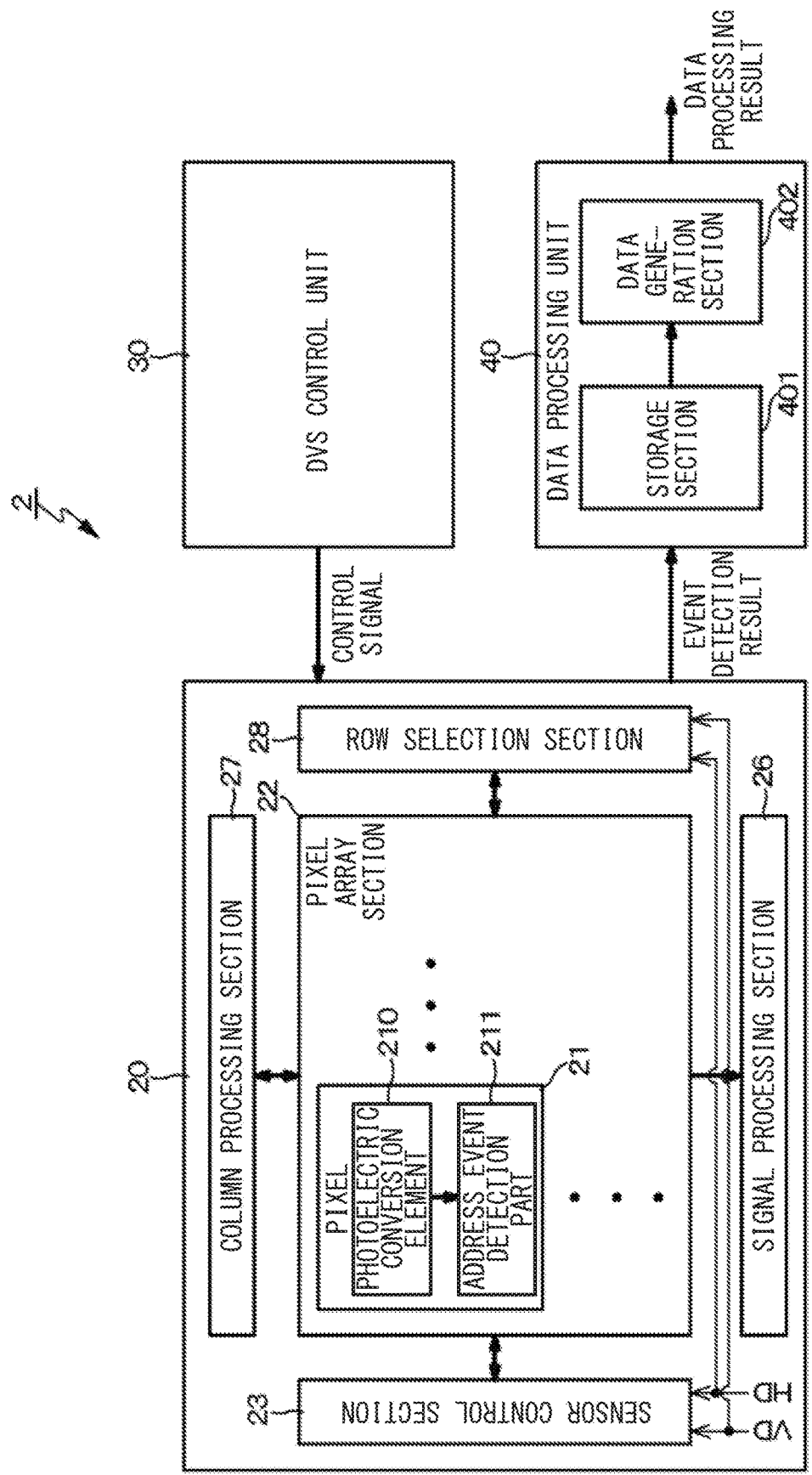
[FIG. 8]

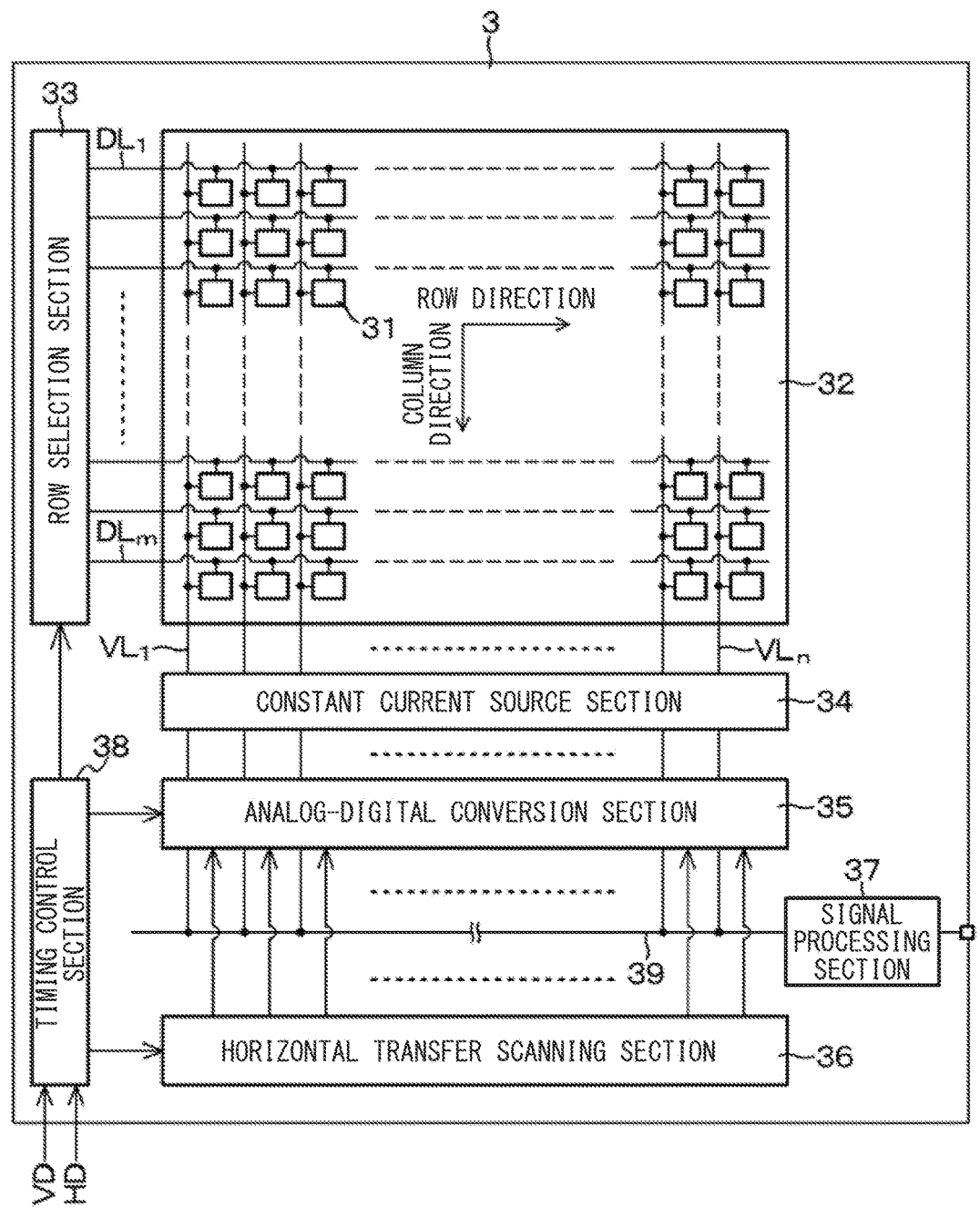
[FIG. 9]

[FIG. 10]
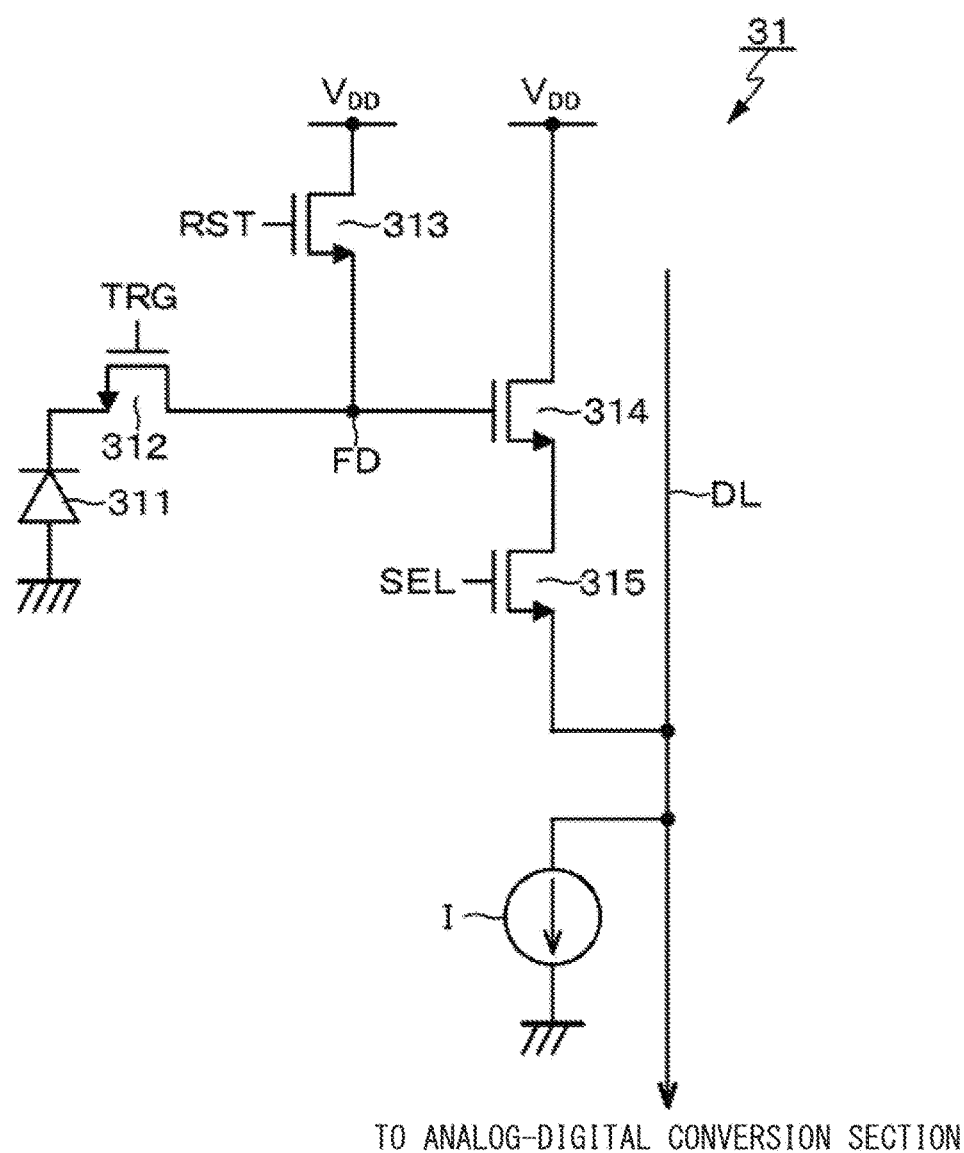

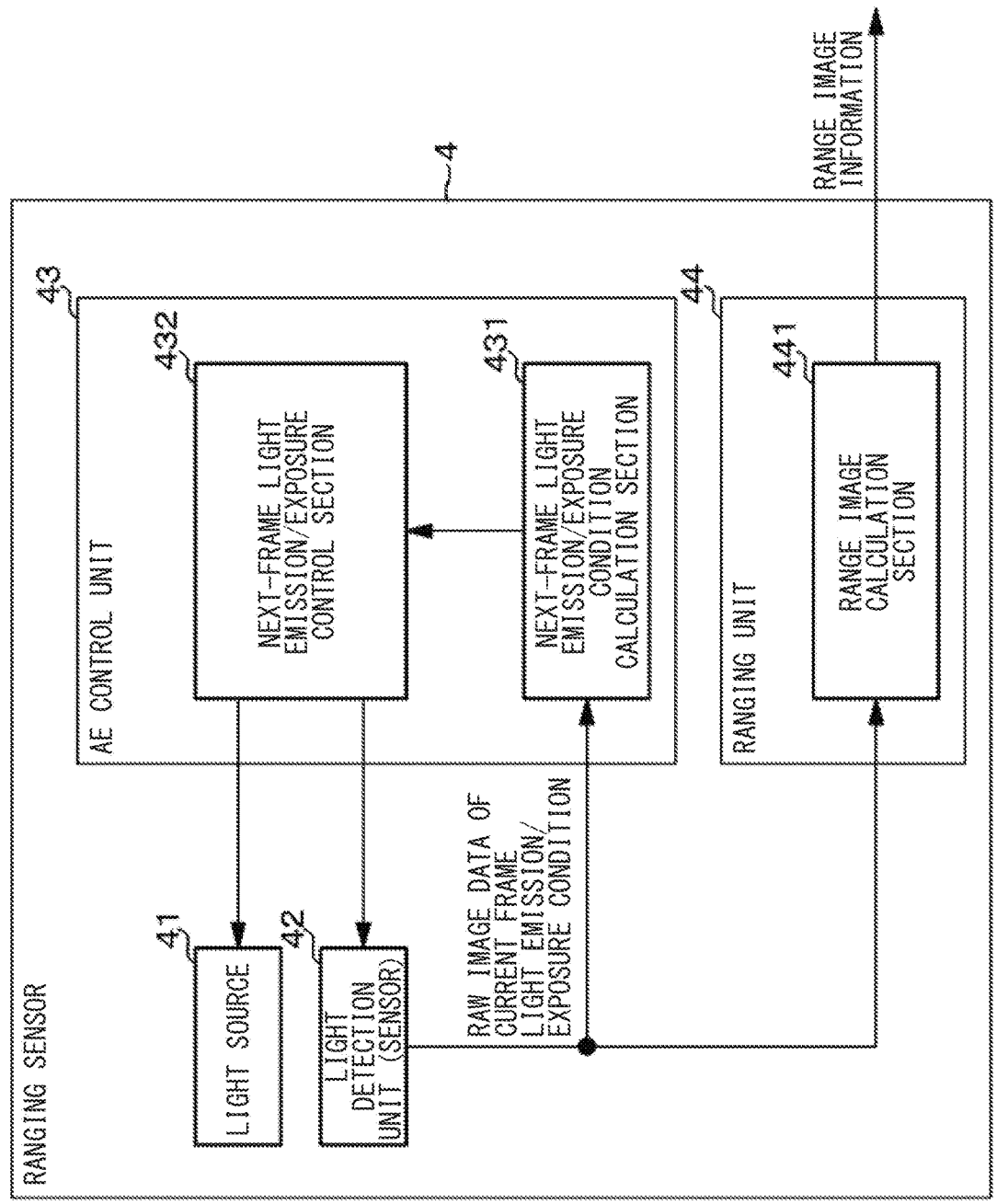
[FIG. 11]

[FIG. 12]
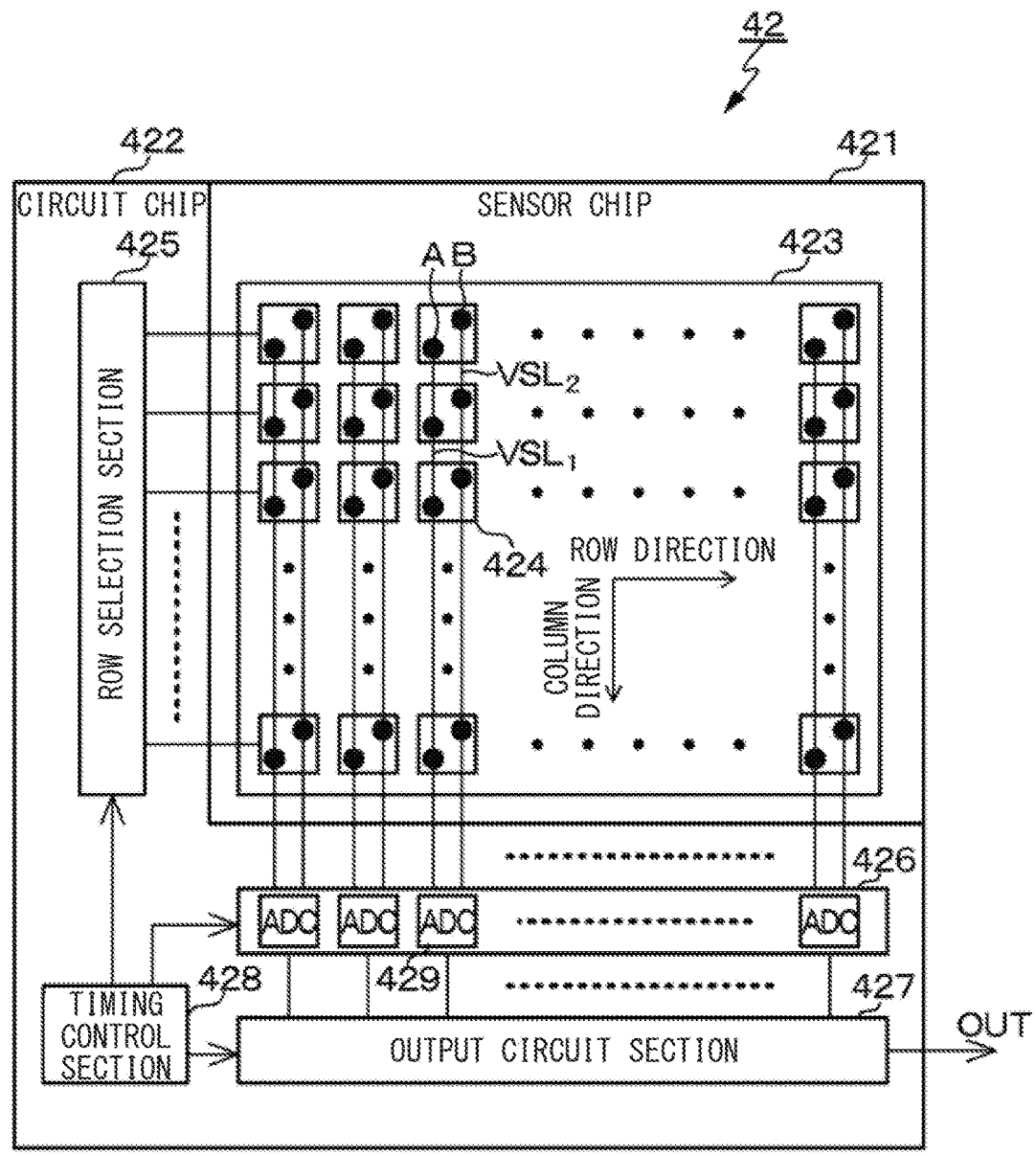

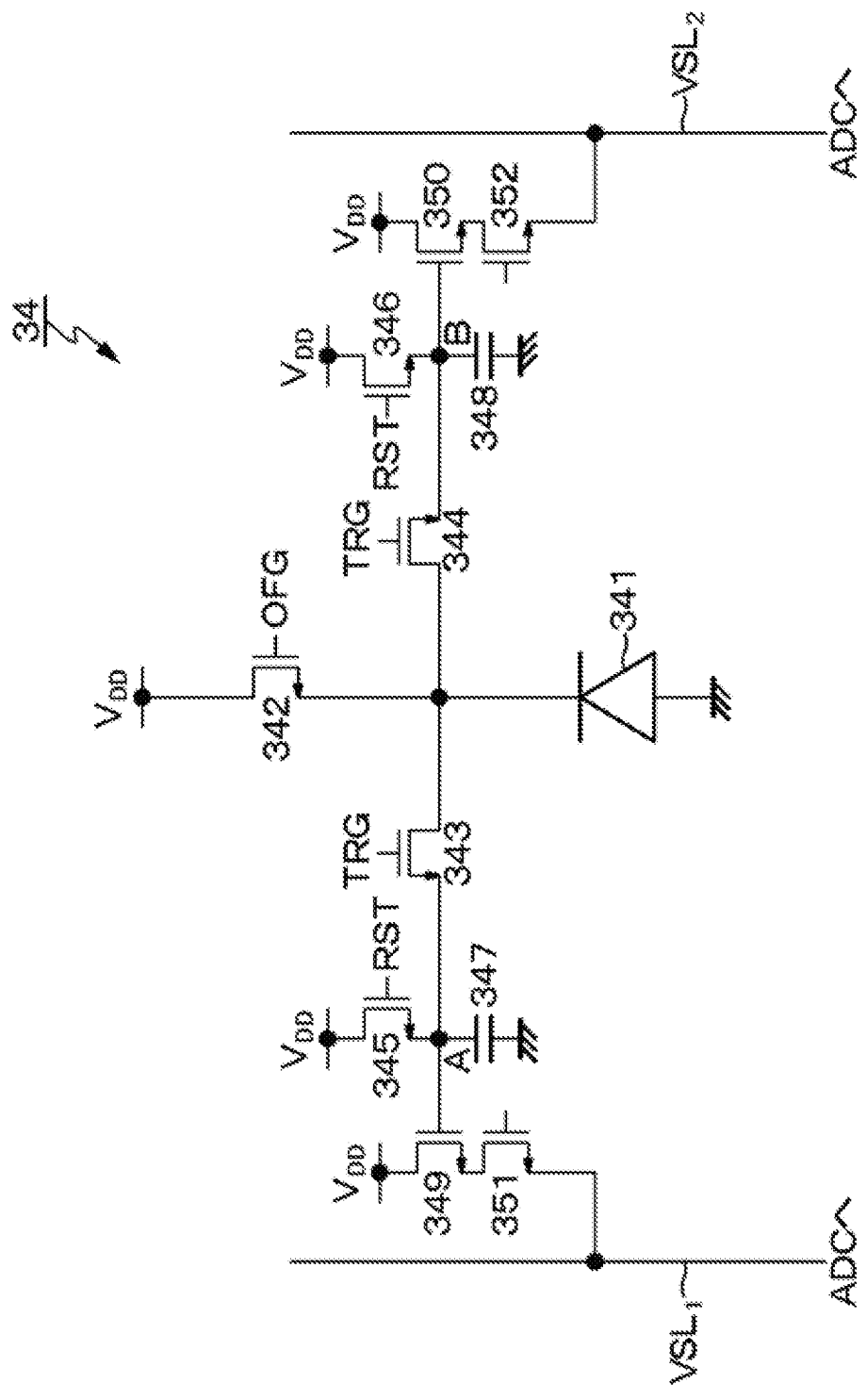
[FIG. 13]

[FIG. 14]
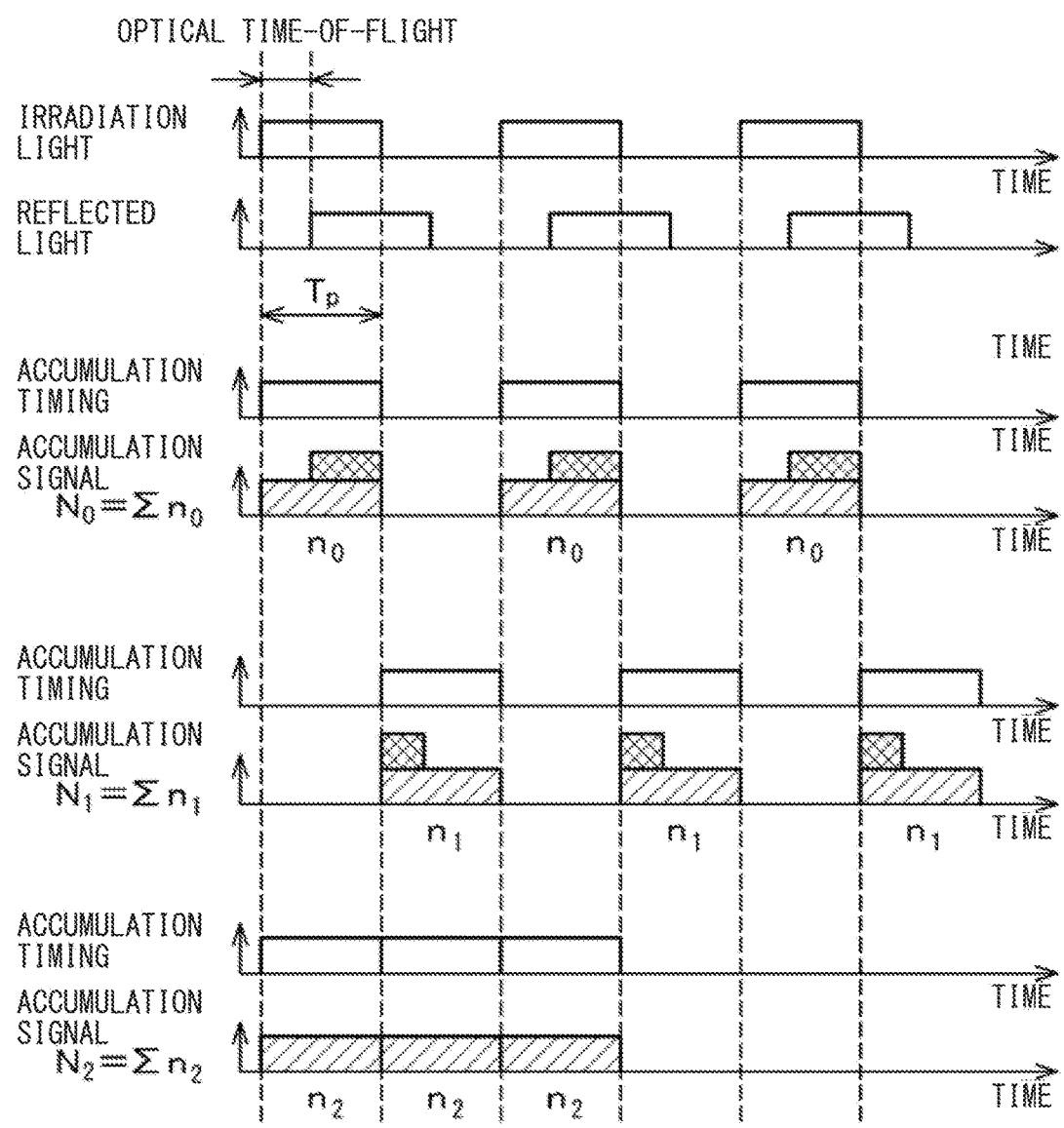

[FIG. 15]
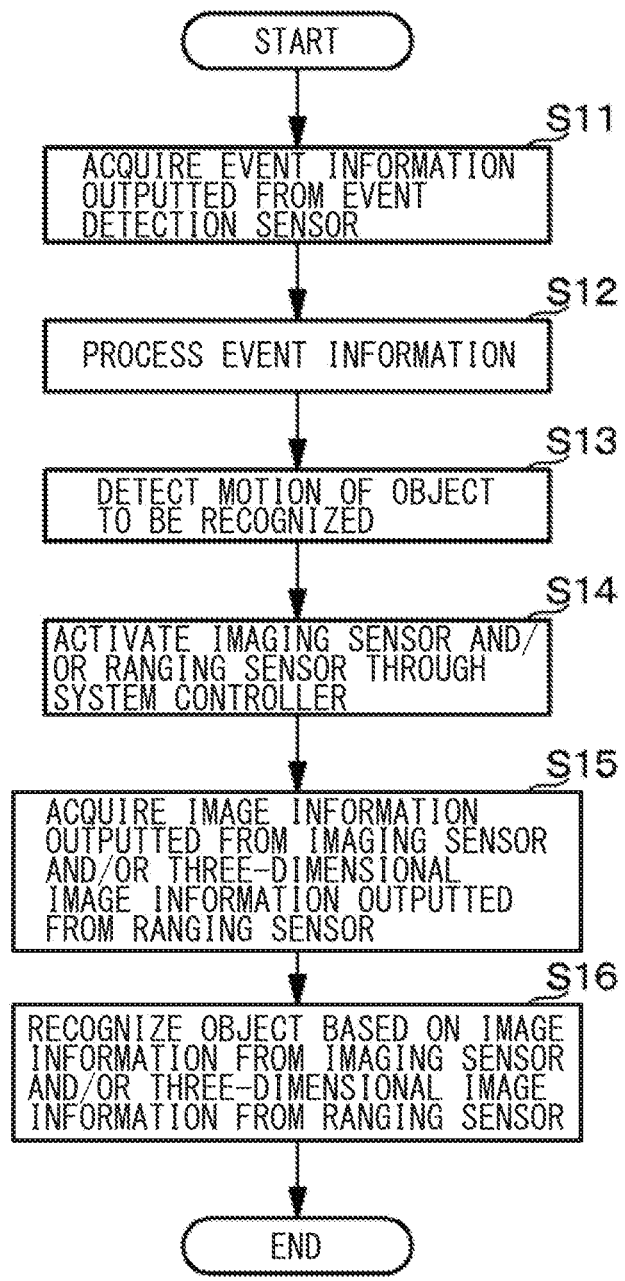

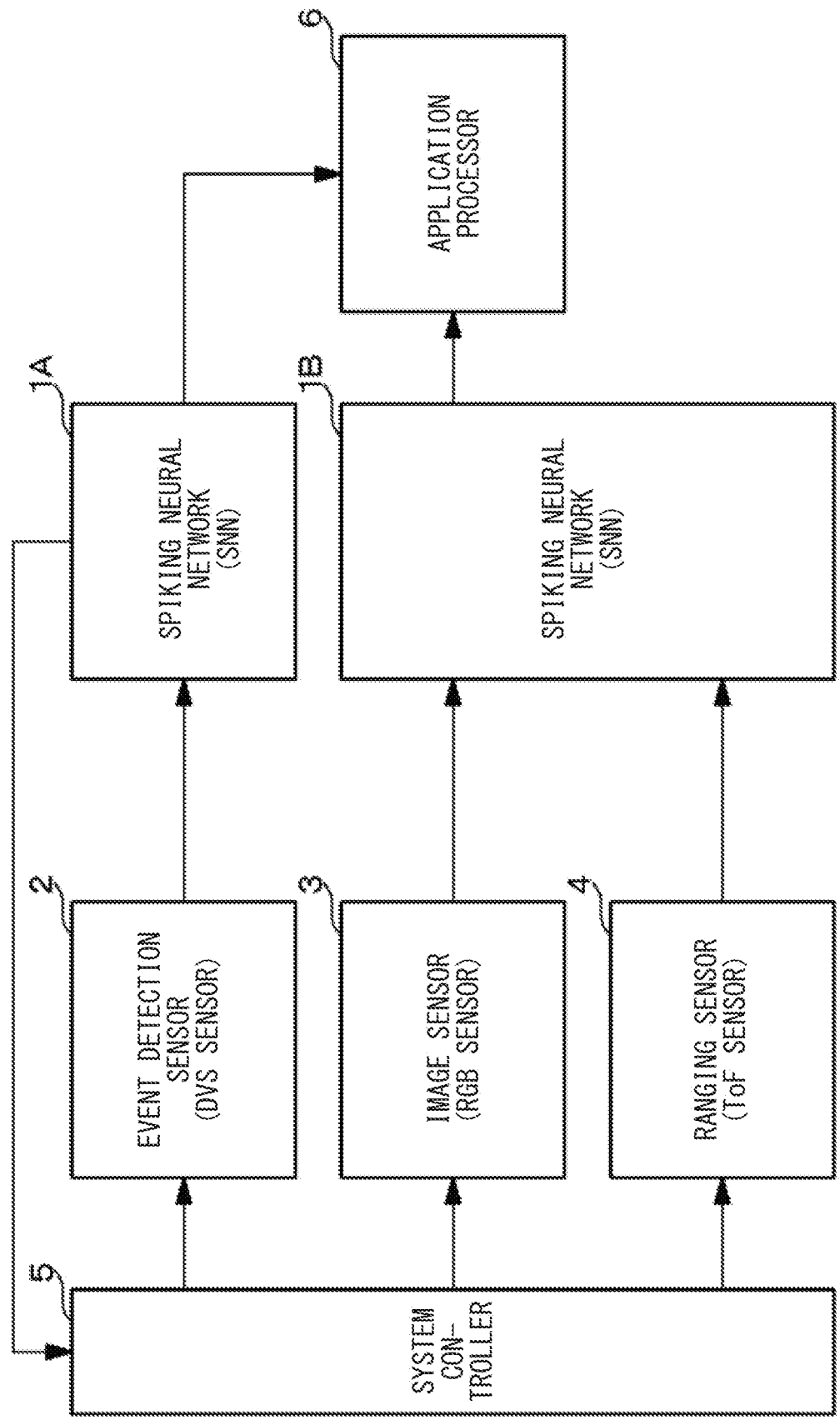

[FIG. 17]
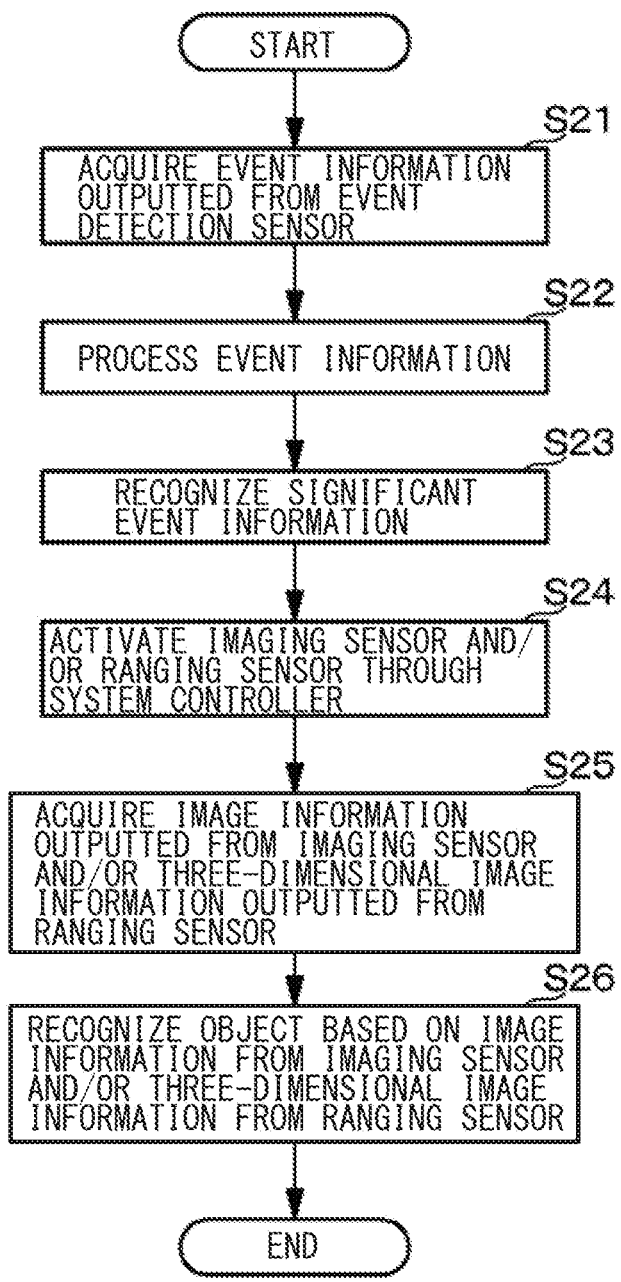

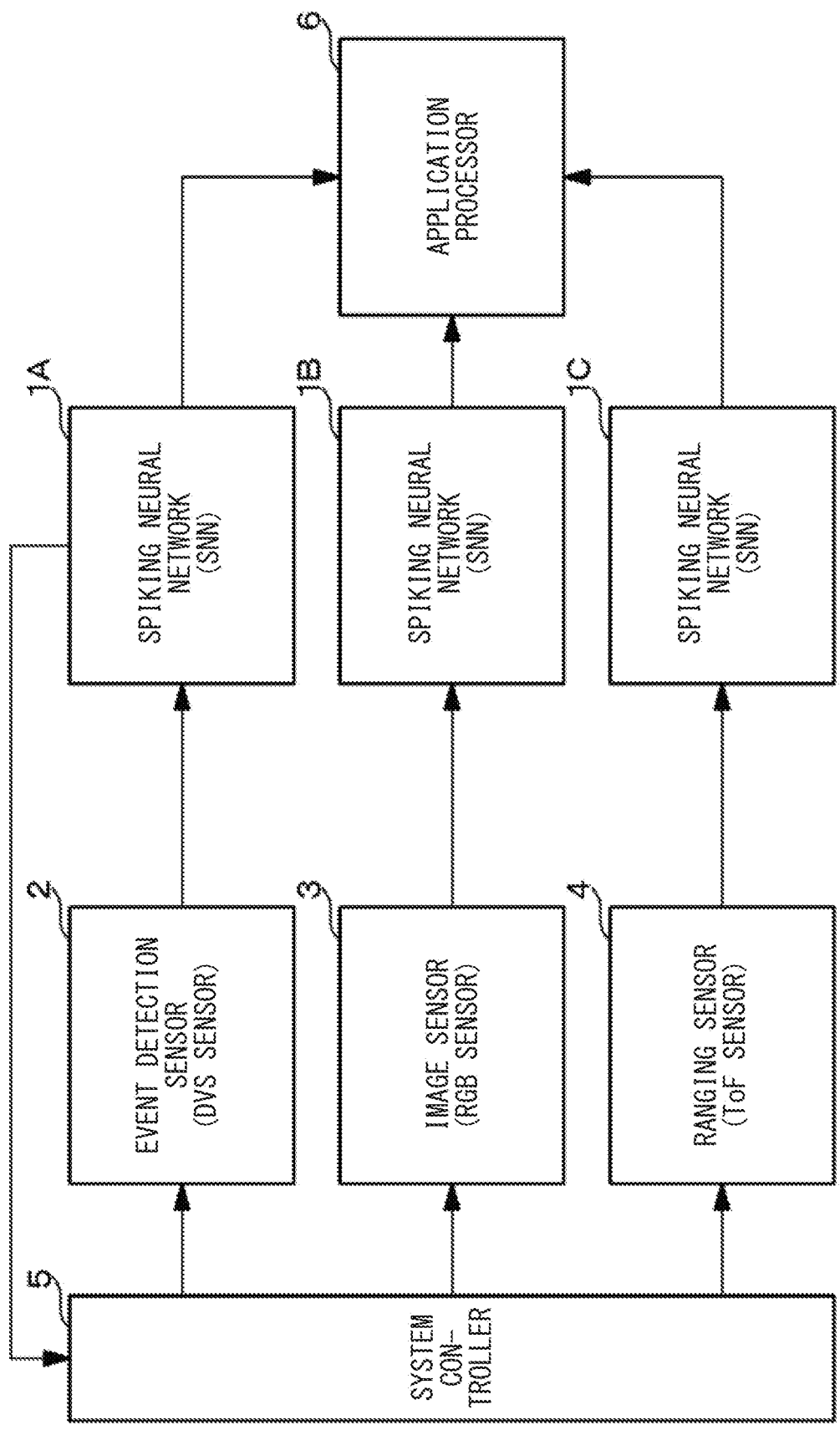
[FIG. 18]

[FIG. 19]
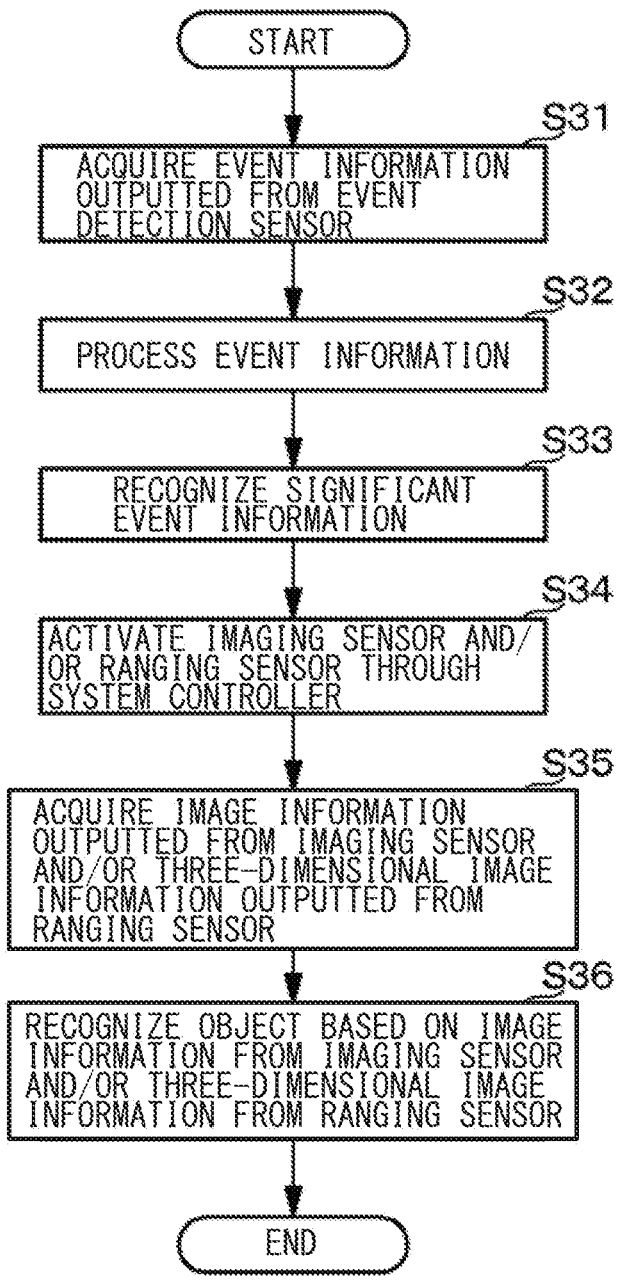

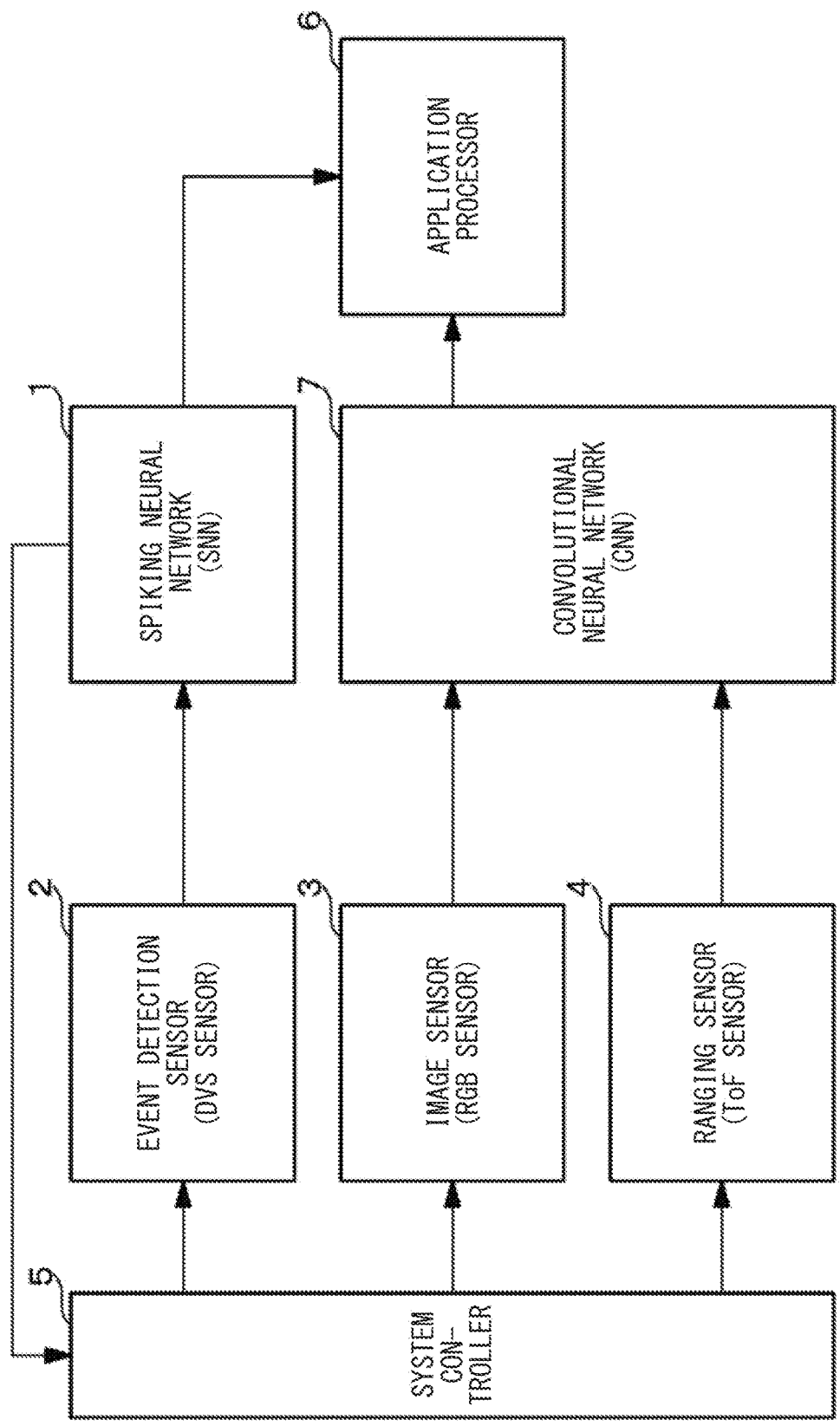
[FIG. 20]

[FIG. 21]
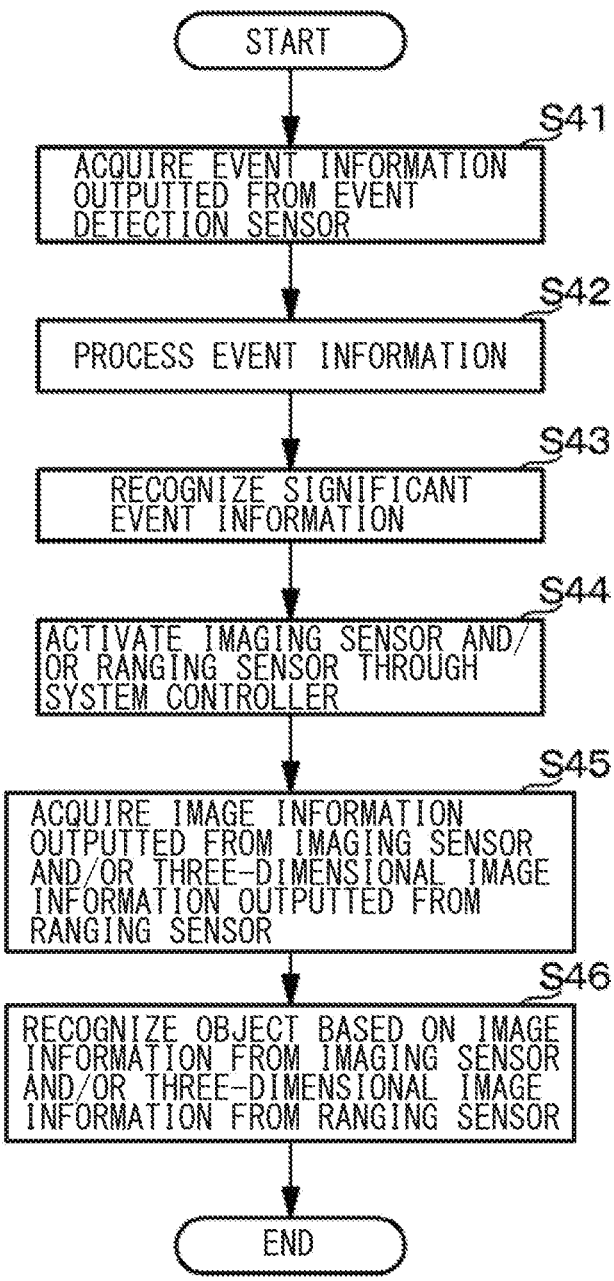

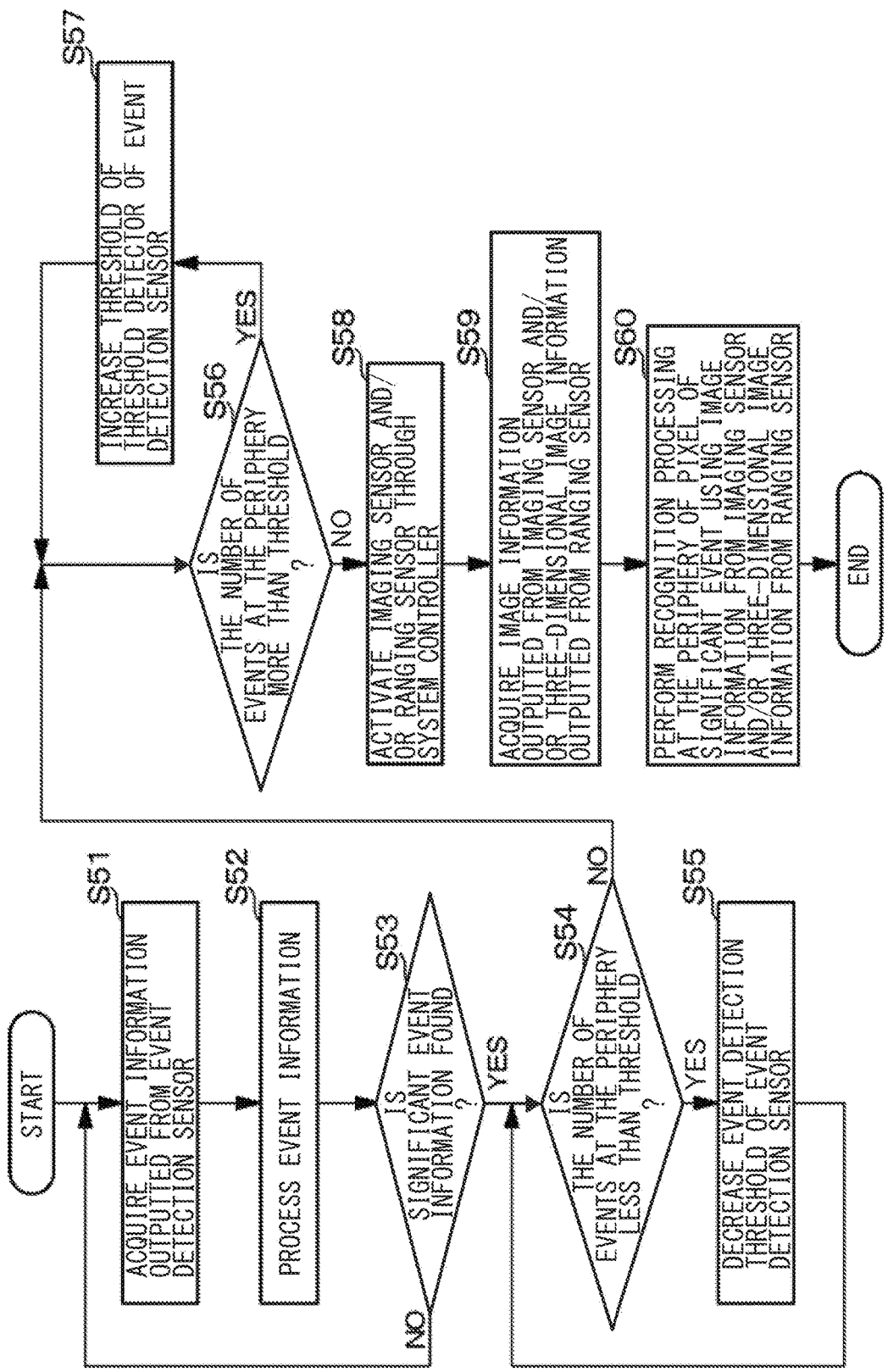

[FIG. 23]
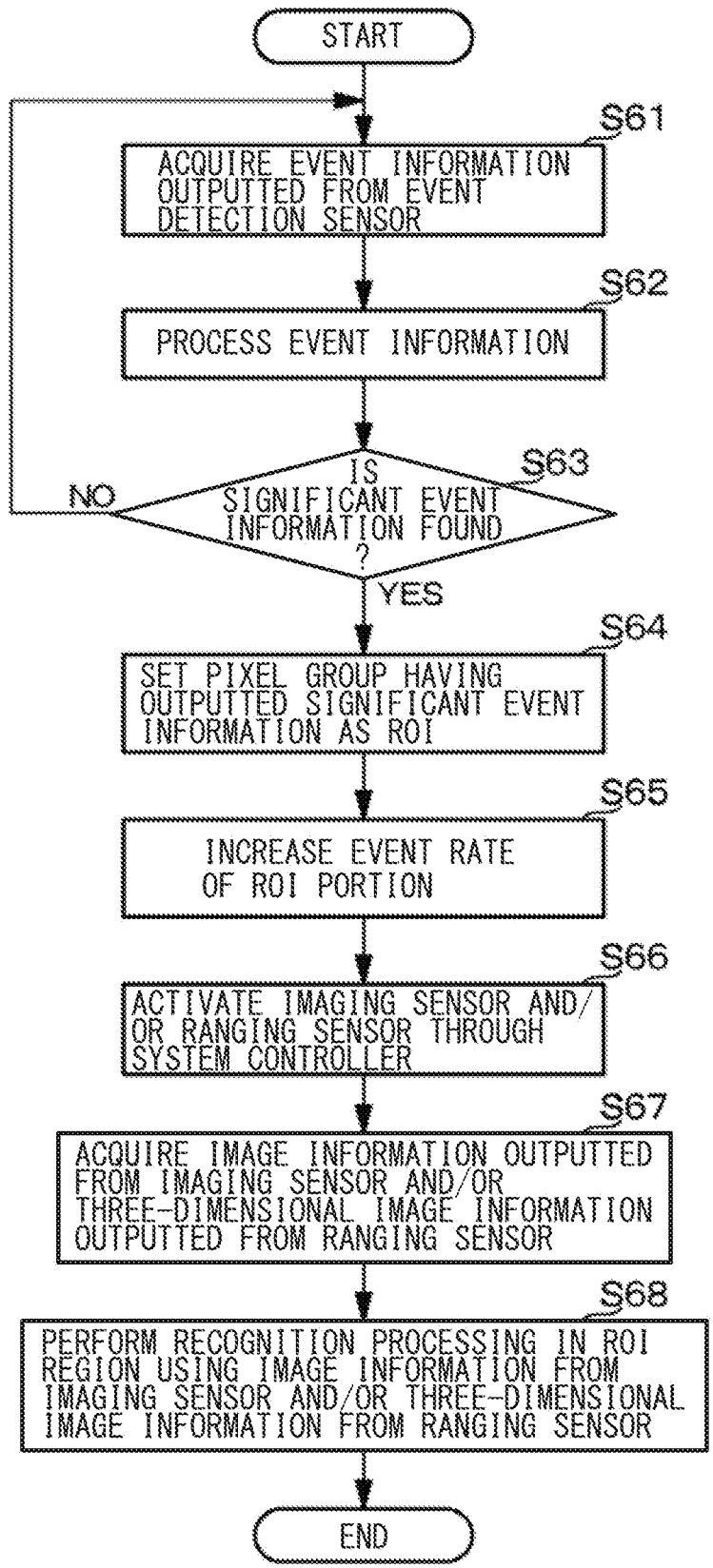

[FIG. 24]
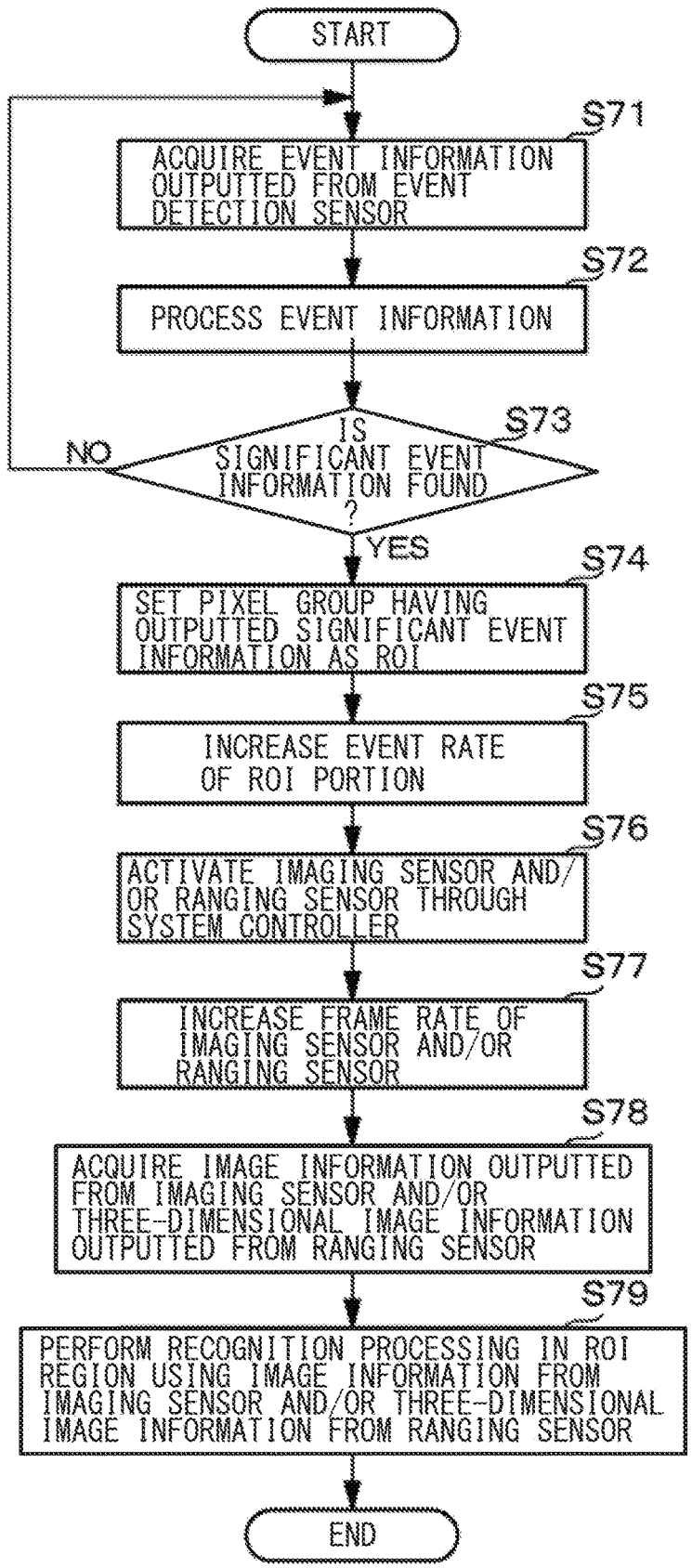

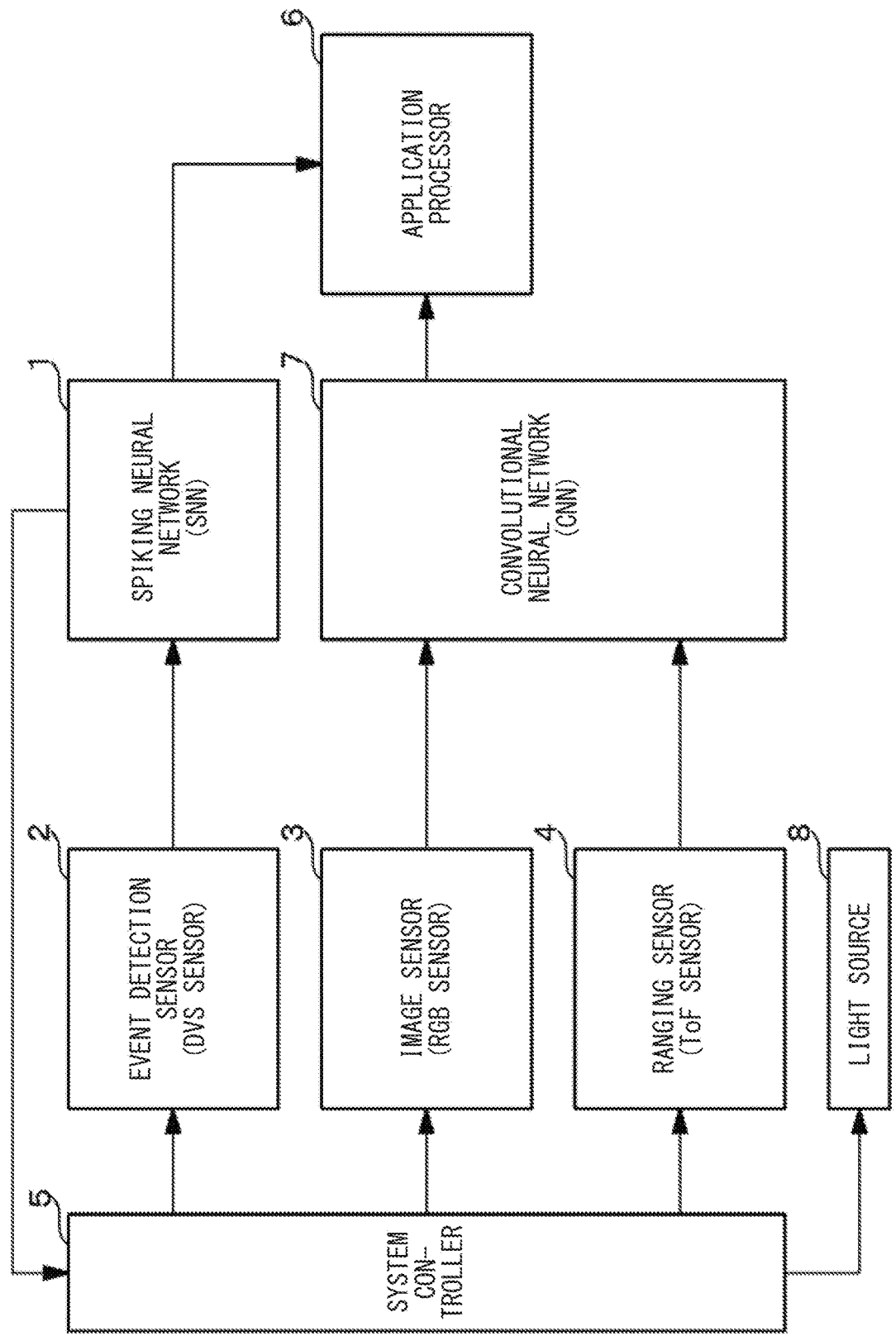
[FIG. 25]

[FIG. 26]
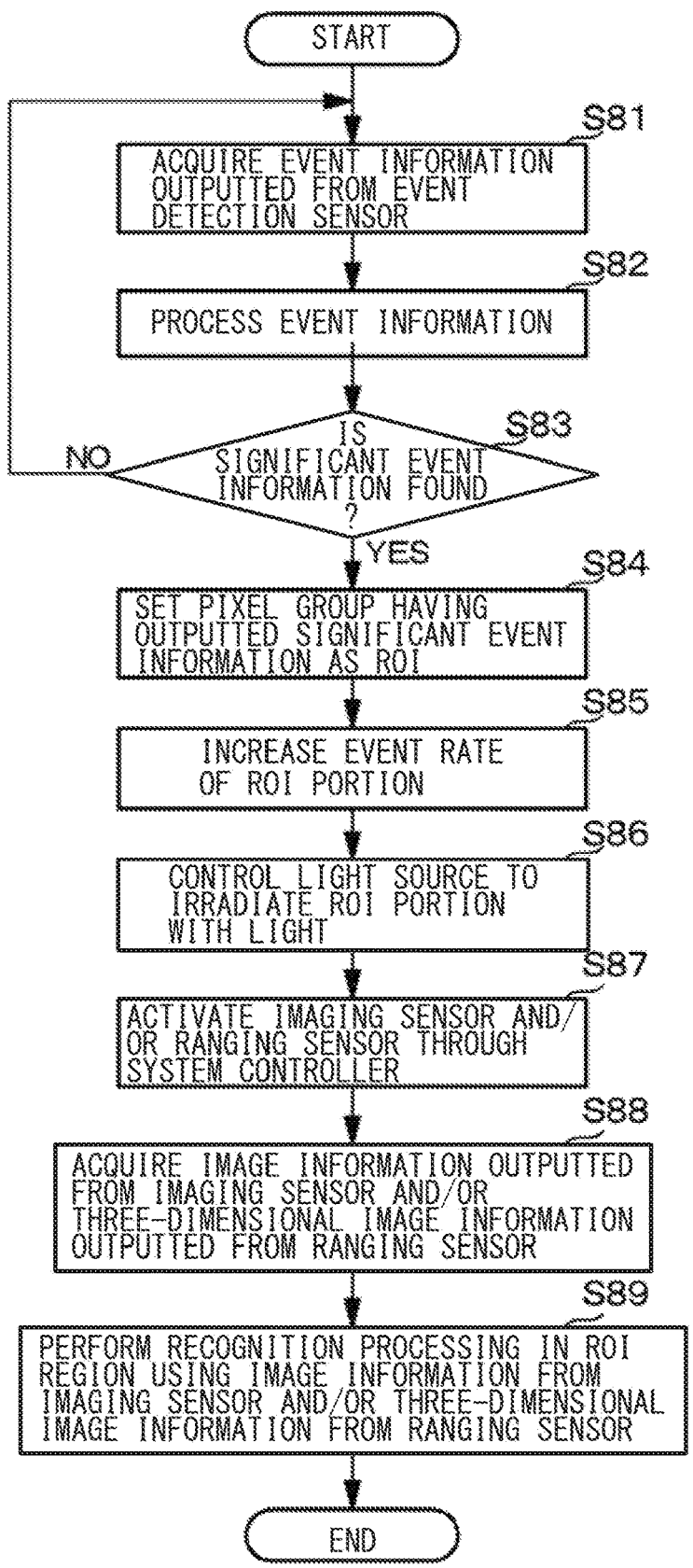

[FIG. 27A]

|  | X-DIRECTION → | | | |
|---|---|---|---|---|
| Y-DIRECTION ↓ | OFF pixel | OFF pixel | OFF pixel | OFF pixel |
|  | OFF pixel | ON pixel | ON pixel | OFF pixel |
|  | OFF pixel | ON pixel | ON pixel | OFF pixel |
|  | OFF pixel | OFF pixel | OFF pixel | OFF pixel |

[FIG. 27B]

|  | X-DIRECTION → | | | |
|---|---|---|---|---|
| Y-DIRECTION ↓ | OFF pixel | ON pixel | OFF pixel | ON pixel |
|  | OFF pixel | OFF pixel | OFF pixel | OFF pixel |
|  | OFF pixel | ON pixel | OFF pixel | ON pixel |
|  | OFF pixel | OFF pixel | OFF pixel | OFF pixel |

[FIG. 28A]
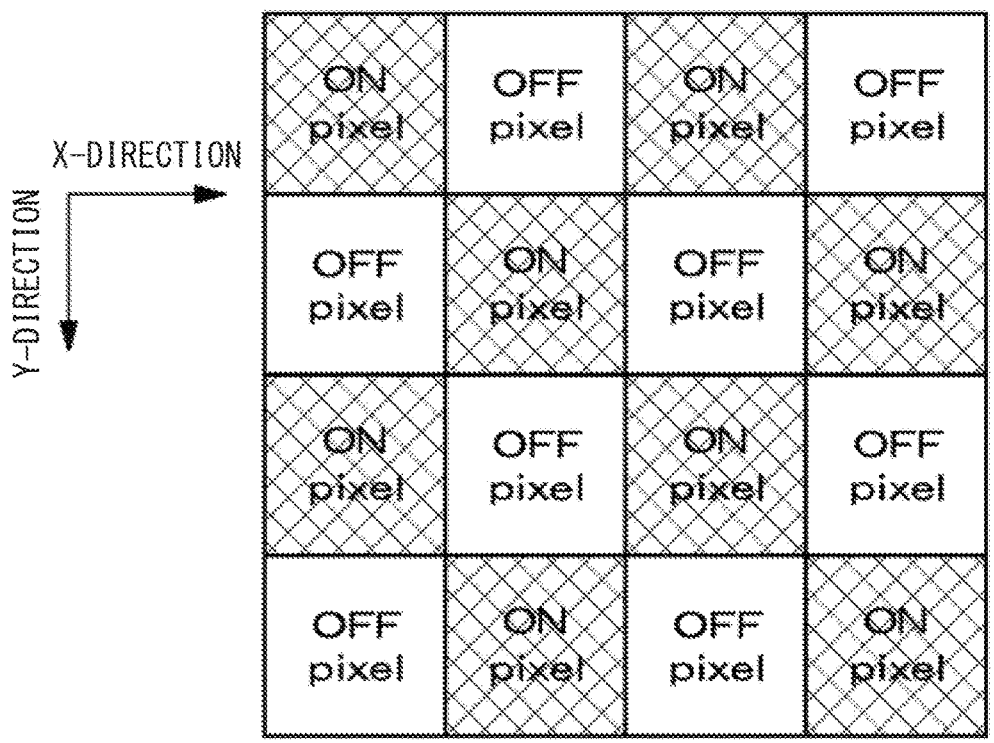
[FIG. 28B]
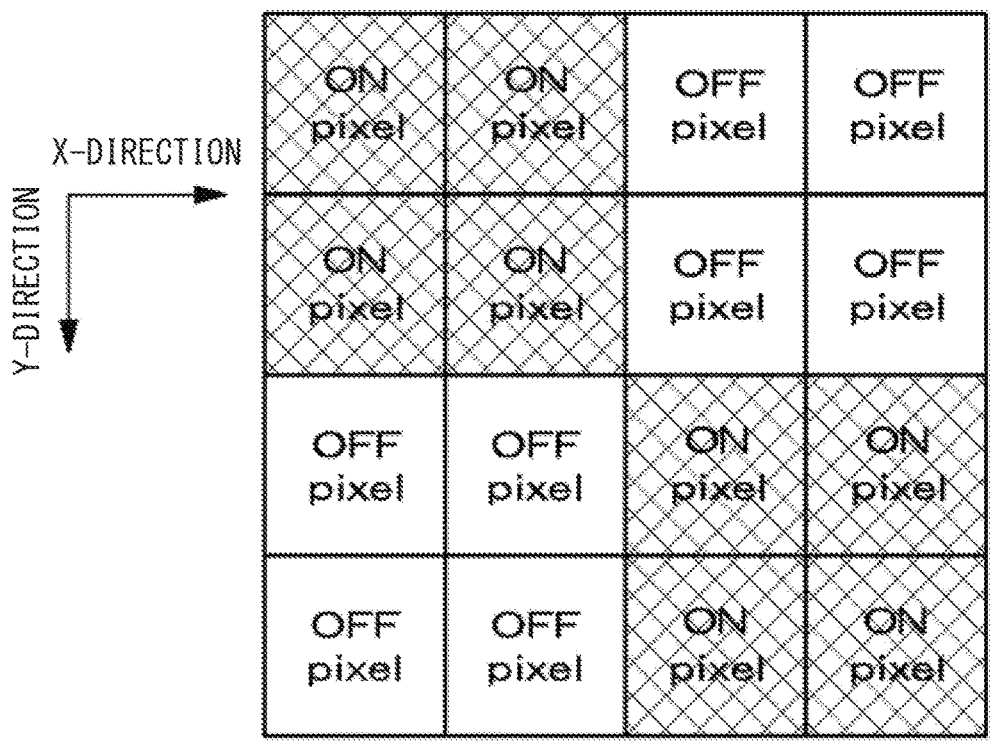

[FIG. 29A]
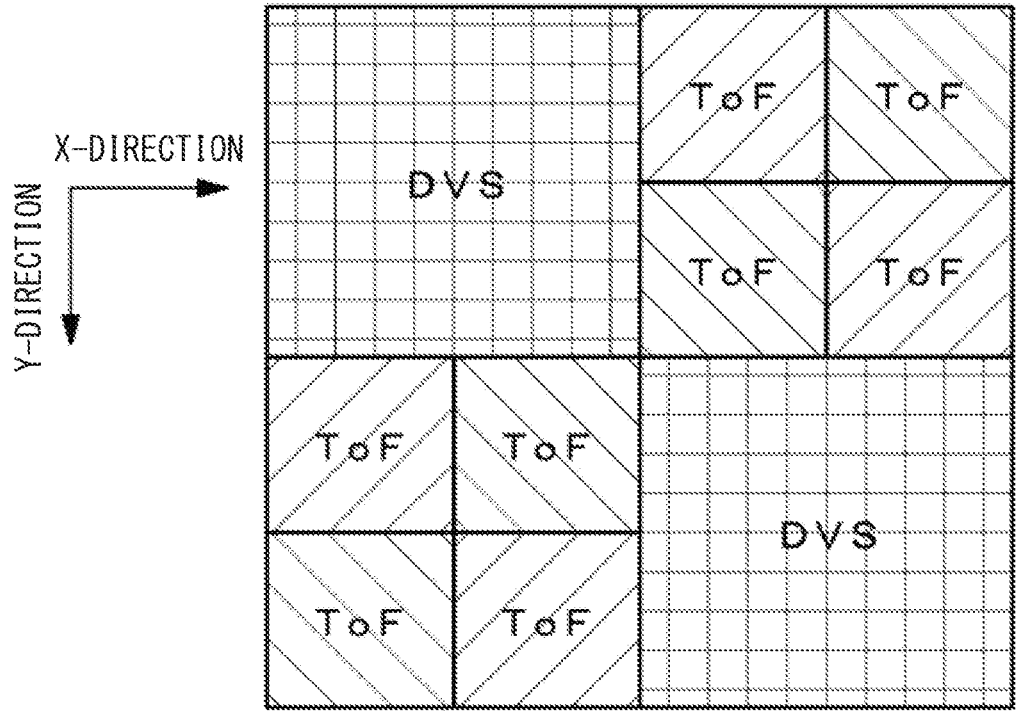
[FIG. 29B]
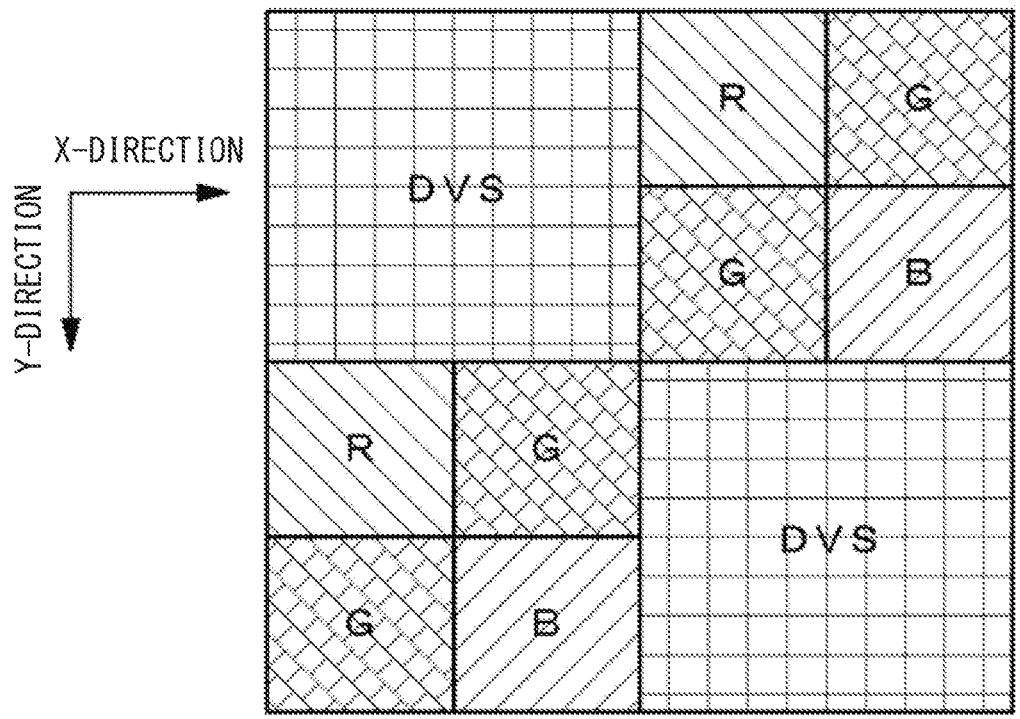

[FIG. 30]
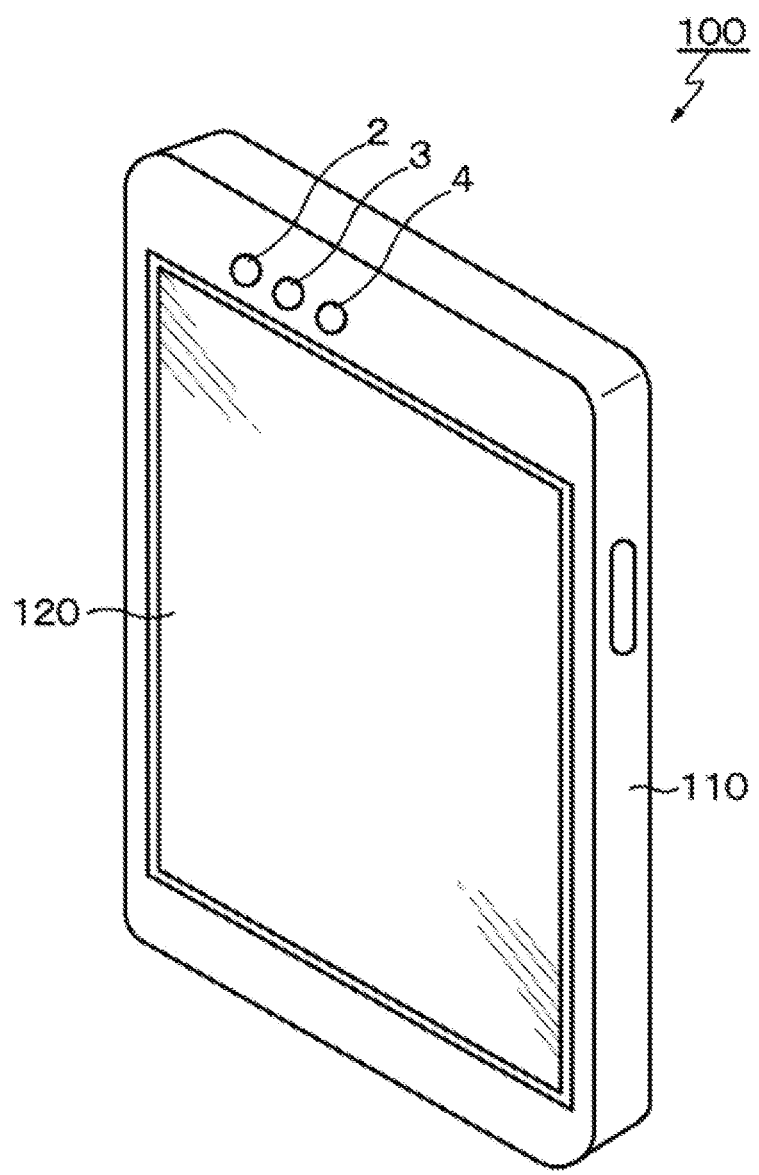

OBJECT RECOGNITION SYSTEM AND ELECTRONIC APPARATUS

CROSS REFERENCE TO RELATED APPLICATIONS

This application is a U.S. National Phase of International Patent Application No. PCT/JP2021/013696 filed on Mar. 30, 2021, which claims priority benefit of Japanese Patent Application No. JP 2020-072261 filed in the Japan Patent Office on Apr. 14, 2020. Each of the above-referenced applications is hereby incorporated herein by reference in its entirety.

TECHNICAL FIELD

The present disclosure relates to an object recognition system and an electronic apparatus.

BACKGROUND ART

In an object recognition system, there is used an asynchronous imaging device called DVS (Dynamic Vision Sensor), for example, as a sensor that recognizes an object as an image (see, e.g., PTL 1). The asynchronous imaging device is able to detect, as an event, that a change in luminance of a pixel that photoelectrically converts incident light has exceeded a predetermined threshold. Accordingly, the asynchronous imaging device of this kind can also be said to be an event detection sensor.

CITATION LIST

Patent Literature

PTL 1: International Publication No. WO 2019/087471

SUMMARY OF THE INVENTION

An event detection sensor described above, which is an asynchronous imaging device, is able to detect an event at a higher speed than a synchronous imaging device that performs imaging in synchronization with a synchronization signal such as a vertical synchronization signal. However, under current conditions, due to interfaces, processing speeds, or the like, event information to be outputted asynchronously and sequentially is outputted in such a manner as to be framed into an image of 30 frames per second, for example. For this reason, although it is possible to perform event detection at a high speed in the case of the event detection sensor, performing the framing processing results in recognition processing being time-consuming.

It is desirable to provide an object recognition system that makes it possible to perform recognition processing at a higher speed and an electronic apparatus including the object recognition system.

An object recognition system according to an embodiment of the present disclosure includes an event detection sensor that detects, as an event, that a change in luminance of a pixel has exceeded a predetermined threshold, and a spiking neural network. The spiking neural network executes recognition processing on an object to be recognized on a basis of a result of the detection by the event detection sensor.

An electronic apparatus according to an embodiment of the present disclosure includes the object recognition system according to an embodiment of the present disclosure.

BRIEF DESCRIPTION OF THE DRAWINGS

FIG. 1A is a block diagram illustrating an object recognition system for analog processing using a spiking neural network, and FIG. 1B is a block diagram illustrating an object recognition system for digital processing using the spiking neural network.

FIG. 2 is a block diagram illustrating an example of a system configuration of an object recognition system according to Example 1.

FIG. 3 is a block diagram illustrating an example of a configuration of an event detection sensor configured by an asynchronous imaging device.

FIG. 4 is a circuit diagram illustrating a circuit configuration of a pixel according to a circuit configuration example 1.

FIG. 5 is a circuit diagram illustrating a circuit configuration of a pixel according to a circuit configuration example 2.

FIG. 6 is a circuit diagram illustrating a circuit configuration of a pixel according to a circuit configuration example 3.

FIG. 7 is a circuit diagram illustrating a circuit configuration of a pixel according to a circuit configuration example 4.

FIG. 8 is a block diagram illustrating an example of a configuration of an event detection sensor configured by a synchronous imaging device.

FIG. 9 is a block diagram illustrating an outline of a configuration of a CMOS image sensor which is an example of an image sensor.

FIG. 10 is a circuit diagram illustrating an example of a circuit configuration of a pixel in the image sensor.

FIG. 11 is a block diagram illustrating an example of a configuration of a ToF ranging sensor.

FIG. 12 is a block diagram illustrating an example of a configuration of a light detection unit in the ranging sensor.

FIG. 13 is a circuit diagram illustrating an example of a circuit configuration of a pixel in the light detection unit.

FIG. 14 is an explanatory timing waveform diagram of calculation of a distance in the ToF ranging sensor.

FIG. 15 is a flowchart illustrating a flow of an example of recognition processing in the object recognition system according to Example 1.

FIG. 16 is a block diagram illustrating an example of a system configuration of an object recognition system according to Example 2.

FIG. 17 is a flowchart illustrating a flow of an example of recognition processing in the object recognition system according to Example 2.

FIG. 18 is a block diagram illustrating an example of a system configuration of an object recognition system according to Example 3.

FIG. 19 is a flowchart illustrating a flow of an example of recognition processing in the object recognition system according to Example 3.

FIG. 20 is a block diagram illustrating an example of a system configuration of an object recognition system according to Example 4.

FIG. 21 is a flowchart illustrating a flow of an example of recognition processing in the object recognition system according to Example 4.

FIG. 22 is a flowchart illustrating a flow of an example of threshold control of an event detection sensor according to Example 5.

FIG. 23 is a flowchart illustrating a flow of an example of threshold control of an event detection sensor according to Example 6.

FIG. 24 is a flowchart illustrating a flow of an example of threshold control of an event detection sensor according to Example 7.

FIG. 25 is a block diagram illustrating an example of a system configuration of an object recognition system according to Example 8.

FIG. 26 is a flowchart illustrating a flow of an example of recognition processing in the object recognition system according to Example 8.

FIGS. 27A and 27B are each a diagram illustrating a pixel arrangement example (No. 1) of ON pixels and OFF pixels according to Example 9.

FIGS. 28A and 28B are each a diagram illustrating a pixel arrangement example (No. 2) of the ON pixels and the OFF pixels according to Example 9.

FIG. 29A is a diagram illustrating a sensor arrangement example of DVS sensors and ToF sensors according to Example 10, and FIG. 29B is a diagram illustrating a sensor arrangement example of the DVS sensors and RGB sensors according to Example 10.

FIG. 30 is an external view of a smartphone, which is an example of an electronic apparatus of the present disclosure, as viewed from a front side.

MODES FOR CARRYING OUT THE INVENTION

Hereinafter, description is given in detail of modes for implementing the technology (hereinafter, described as "embodiments") of the present disclosure with reference to the drawings. The technology of the present disclosure is not limited to the embodiments. In the following descriptions, the same components or components having the same functions are denoted by the same reference numerals, and overlapping descriptions are omitted. It is to be noted that descriptions are given in the following order.

1. Object Recognition System and Electronic Apparatus of Present Disclosure, and General Description
2. Embodiments of Present Disclosure
   2-1. Example 1 (An example of using a plurality of sensors as a detection device that detects an object)
      2-1-1. System Configuration
      2-1-2. Configuration Example of Event Detection Sensor Including Asynchronous Imaging Device
      2-1-3. Circuit Configuration Examples of Pixel
         2-1-3-1. Circuit Configuration Example 1
         2-1-3-2. Circuit Configuration Example 2
         2-1-3-3. Circuit Configuration Example 3
         2-1-3-4. Circuit Configuration Example 4
      2-1-4. Configuration Example of Event Detection Sensor Including Synchronous Imaging Device
      2-1-5. Configuration Example of Image Sensor
         2-1-5-1. Configuration Example of CMOS Image Sensor
         2-1-5-2. Circuit Configuration Example of Pixel
      2-1-6. Configuration Example of Ranging Sensor
         2-1-6-1. System Configuration
         2-1-6-2. Configuration Example of Light Detection Unit
         2-1-6-3. Circuit Configuration Example of Pixel
      2-1-7. Recognition Processing Example of Object Recognition System according to Example 1
   2-2. Example 2 (Modification Example of Example 1: an example of providing two spiking neural networks for an event detection sensor, an image sensor, and a ranging sensor)
      2-2-1. System Configuration
      2-2-2. Recognition Processing Example of Object Recognition System according to Example 2
   2-3. Example 3 (Modification Example of Example 1: an example of providing a spiking neural network for each of an event detection sensor, an image sensor, and a ranging sensor)
      2-3-1. System Configuration
      2-3-2. Recognition Processing Example of Object Recognition System according to Example 3
   2-4. Example 4 (An example of using a convolutional neural network in addition to a spiking neural network)
      2-4-1. System Configuration
      2-4-2. Recognition Processing Example of Object Recognition System according to Example 4
   2-5. Example 5 (Modification Example of Example 4: an example of controlling a threshold of an event detection sensor).
   2-6. Example 6 (Modification Example of Example 4: an example of controlling an event rate of a specific region of an event detection sensor)
   2-7. Example 7 (Modification Example of Example 4: an example of controlling an event rate of a specific region of an event detection sensor and a frame rate of an image sensor and/or a ranging sensor)
   2-8. Example 8 (An example of controlling a light source used in a ranging sensor, or the like)
      2-8-1. System Configuration
      2-8-2. Recognition Processing Example of Object Recognition System according to Example 8
   2-9. Example 9 (Pixel arrangement example in a case where ON pixels and OFF pixels are present in a mixed manner in an event detection sensor)
   2-10. Example 10 (Sensor arrangement example in a case where DVS sensors and RGB sensors as well as DVS sensors and ToF sensors are present in a mixed manner)
3. Modification Example
4. Electronic Apparatus of Present Disclosure (Example of Smartphone)
5. Configuration Implementable by Present Disclosure <Object Recognition System and Electronic Apparatus of Present Disclosure, and General Description>

In an object recognition system and an electronic apparatus of the present disclosure, an event detection sensor may be configured to include an asynchronous imaging device.

The above-described object recognition system and electronic apparatus of the present disclosure having preferred configurations may be configured to include at least one sensor of an image sensor that acquires image information on an object to be recognized or a ranging sensor that acquires three-dimensional image information on an object to be recognized. The image sensor may be configured to include a synchronous imaging device that performs imaging at a predetermined frame rate. The ranging sensor may be configured to include a ToF ranging device that irradiates an object to be recognized with light and detects optical time-of-flight until return of the irradiation light reflected by the object to be recognized.

In addition, in the above-described object recognition system and electronic apparatus of the present disclosure having preferred configurations, the spiking neural network may be configured to include a first spiking neural network that performs recognition processing on a basis of event information outputted from the event detection sensor, and a second spiking neural network that performs recognition processing on a basis of at least one information of the image information outputted from the image sensor or the three-dimensional image information outputted from the ranging sensor.

Alternatively, in the above-described object recognition system and electronic apparatus of the present disclosure having preferred configurations, the spiking neural network may be configured to include a first spiking neural network that performs recognition processing on a basis of event information outputted from the event detection sensor, a second spiking neural network that performs recognition processing on a basis of the image information outputted from the image sensor, and a third spiking neural network that performs recognition processing on a basis of the three-dimensional image information outputted from the ranging sensor.

In addition, the above-described object recognition system and electronic apparatus of the present disclosure having preferred configurations may be configured to include a convolutional neural network that performs recognition processing on a basis of at least one information of the image information outputted from the image sensor or the three-dimensional image information outputted from the ranging sensor.

In addition, in the above-described object recognition system and electronic apparatus of the present disclosure having preferred configurations, a configuration may be adopted in which, in the event detection sensor, an event detection threshold of the event detection sensor is controlled in accordance with the number of events at the periphery of a pixel having outputted significant event information. Alternatively, a configuration may be adopted in which, in the event detection sensor, a pixel group having outputted significant event information is set as a region of interest, and an event rate of a portion of the region of interest is increased.

In addition, in the above-described object recognition system and electronic apparatus of the present disclosure having preferred configurations, a configuration may be adopted in which, in the event detection sensor, a pixel group having outputted significant event information is set as a region of interest, and an event rate of a portion of the region of interest is increased, and a frame rate of at least one of the image sensor or the ranging sensor is increased.

In addition, the above-described object recognition system and electronic apparatus of the present disclosure having preferred configurations may be configured to include a light source that irradiates an object to be recognized with light, and a configuration may be adopted in which, in the event detection sensor, a pixel group having outputted significant event information is set as a region of interest, and an event rate of a portion of the region of interest is increased, and the light source is controlled to irradiate the portion of the region of interest with light.

Embodiment of Present Disclosure

The object recognition system according to an embodiment of the present disclosure is one of deep learning (deep learning) methods often used in image recognition for an object to be recognized, and is characterized in that recognition processing is performed using a spiking neural network (SNN: Spiking Neural Networks) in which nerve cells are modeled more scrupulously than a typical neural network. The spiking neural network is a model that focuses not on firing frequency but on an inner potential of a neuron, and represents an analog amount in a pulse timing. In addition, the spiking neural network operates asynchronously, and thus high-speed processing is possible.

Examples of the object recognition system using the spiking neural network may include analog processing illustrated in FIG. 1A and digital processing illustrated in FIG. 1B. Information regarding an object to be recognized is inputted to a spiking neural network 1 from a detection device that detects the object. Here, description is given by exemplifying a case of using an event detection sensor 2, which is an example of the asynchronous imaging device, as a detection device that detects an object to be recognized. The event detection sensor 2 detects, as an event, that a change in luminance of a pixel has exceeded a predetermined threshold (event detection threshold).

In a case of analog processing illustrated in FIG. 1A, X-Y address information to identify coordinate points of the object to be recognized is inputted, as analog event information, from the event detection sensor 2 to the spiking neural network 1 corresponding to analog processing. The spiking neural network 1 corresponding to the analog processing acquires time information in the order of entry of pieces of event information, and outputs a result of recognition such as object detection or object recognition, on the basis of the X-Y address information and the time information.

In a case of digital processing illustrated in FIG. 1B, the X-Y address information and a time stamp indicating relative time at which an event has occurred are inputted, as digital event information, from the event detection sensor 2 to the spiking neural network 1 corresponding to digital processing. The spiking neural network 1 corresponding to the digital processing outputs a result of recognition such as object detection or object recognition, on the basis of the X-Y address information and the time stamp.

According to the object recognition system of the present embodiment, the spiking neural network 1 is used to perform recognition processing such as object detection or object recognition, thus making it unnecessary to perform framing processing on a side of the event detection sensor 2, and enabling the spiking neural network 1 to perform high-speed processing. This makes it possible to perform recognition processing at a higher speed.

Hereinafter, description is given of specific Examples of the object recognition system according to the present embodiment.

Example 1

Example 1 is an example of the object recognition system that uses a plurality of sensors as a detection device that detects an object to be recognized. FIG. 2 illustrates an example of a system configuration of the object recognition system according to Example 1.

[System Configuration]

As illustrated in FIG. 2, the object recognition system according to Example 1 includes, in addition to the spiking neural network 1 that performs recognition processing, for example, three sensors of the event detection sensor 2, an image sensor 3, and a ranging sensor 4, as the detection device that detects an object to be recognized; the object recognition system further includes a system controller 5 and an application processor 6.

The event detection sensor 2 is a sensor called DVS, and detects, as an event, that a change in luminance of a pixel that photoelectrically converts incident light has exceeded a predetermined threshold (event detect threshold) to supply event information to the spiking neural network 1. It may be possible to use, as the event detection sensor 2, for example, an asynchronous imaging device. However, the event detection sensor 2 is not limited to the asynchronous imaging device, but a synchronous imaging device may also be used.

The image sensor 3 is a synchronous imaging device that performs imaging in synchronization with a synchronization signal such as a vertical synchronization signal. That is, the image sensor 3 is an imaging device that captures an image at a predetermined frame rate, e.g., a fixed frame rate, and supplies the captured image information to the spiking neural network 1. It may be possible to use, as the image sensor 3, for example, an RGB sensor described later.

The ranging sensor 4 is a ranging device that acquires distance information (range image information) to an object to be recognized (subject) and three-dimensional image information (depth information of an object surface/depth information), and supplies the distance information and the three-dimensional image information to the spiking neural network 1. It may be possible to use, as the ranging sensor 4, a ToF (Time of Flight: optical time-of-flight) sensor that irradiates the object to be recognized (subject) with light from a light source, and detects optical time-of-flight until return of the irradiation light reflected by the object to be recognized to a detection unit.

The system controller 5 includes, for example, a processor, and controls the event detection sensor 2, the image sensor 3, and the ranging sensor 4, under instruction from the spiking neural network 1. Pieces of information regarding the object to be recognized acquired in the event detection sensor 2, the image sensor 3, and the ranging sensor 4 are supplied to the spiking neural network 1.

First, the spiking neural network 1 activates the event detection sensor 2 through the system controller 5 to bring it into an operational state. When the event detection sensor 2 in the operational state detects an event to cause event information to be outputted from the event detection sensor 2, the spiking neural network 1 receives the event information, and activates the image sensor 3 and/or the ranging sensor 4 through the system controller 5.

Then, on the basis of the image information outputted from the image sensor 3 and/or the three-dimensional image information outputted from the ranging sensor 4, the spiking neural network 1 performs recognition processing of the object to be recognized, and supplies a result of recognition such as object detection or object recognition to the application processor 6 in the next stage.

Upon reception of the result of the recognition such as the object detection or the object recognition supplied from the spiking neural network 1, the application processor 6 executes predetermined processing, e.g., processing such as face detection or face authentication.

Hereinafter, description is given of an example of specific configurations of the event detection sensor 2, the image sensor 3, and the ranging sensor 4.

[Configuration Example of Event Detection Sensor Including Asynchronous Imaging Device]

FIG. 3 illustrates an example of a configuration of an event detection sensor including an asynchronous imaging device. The event detection sensor 2 includes a DVS sensor unit 20, a DVS control unit 30, and a data processing unit 40.

The DVS sensor unit 20 includes a pixel array section 22 in which a plurality of pixel 21 are arranged two-dimensionally in matrix (in an array manner). Each of the plurality of pixels 21 includes a photoelectric conversion element 210 and an address event detection part 211, and generates and outputs, as a pixel signal, an analog signal of a voltage corresponding to a photocurrent as an electric signal generated by photoelectric conversion at the photoelectric conversion element 210. In addition, each of the plurality of pixels 21 detects, in the address event detection part 211, presence or absence of an event, depending on whether or not a change exceeding a predetermined threshold is generated in the photocurrent corresponding to luminance of incident light. In other words, each of the plurality of pixels 21 detects, as an event, that a change in luminance has exceeded a predetermined threshold (event detection threshold).

The DVS sensor unit 20 includes, in addition to the pixel array section 22 in which the plurality of pixels 21 are arranged two-dimensionally in matrix, a sensor control section 23, an X-arbiter section 24, a Y-arbiter section 25, and a signal processing section 26, as a peripheral circuit section of the pixel array section 22. Here, the X in the X-arbiter section 24 means a pixel row of the matrix arrangement and the Y in the Y-arbiter section 25 means a pixel column of the matrix arrangement.

When detecting an event, each of the plurality of pixels 21 outputs a request requesting an output of event data indicating occurrence of an event to the X-arbiter section 24 and the Y-arbiter section 25. Then, in a case of receiving a response indicating an approval of the output of the event data from the X-arbiter section 24 and the Y-arbiter section 25, each of the plurality of pixels 21 outputs the event data to the sensor control section 23 and the signal processing section 26.

The sensor control section 23 drives each pixel 21 of the pixel array section 22. The X-arbiter section 24 and the Y-arbiter section 25 arbitrate the request requesting the output of event data supplied from each of the plurality of pixels 21, and transmit a response based on a result of the arbitration (i.e., approval/disapproval of output of event data) and a reset signal resetting the event detection to the pixel 21. The signal processing section 26 executes predetermined signal processing on the event data outputted from the pixel array section 22, and outputs the event data after having undergone the signal processing.

The DVS sensor unit 20 of the above configuration detects, as an event, that a change in luminance of the pixel 21 that photoelectrically converts incident light has exceeded a predetermined threshold, under the control of the DVS control unit 30. Then, a result of the event detection by the DVS sensor unit 20 is supplied to the data processing unit 40. The data processing unit 40 includes a storage section 401 that stores the result of the event detection supplied from the DVS sensor unit 20, and a data generation section 402 that generates data on the basis of a storage content of the storage section 401; the data processing unit 40 outputs a result of the data processing.

As described above, a change in the photocurrent generated by the pixel 21 can also be regarded as a change in a light amount (change in luminance) of light incident on the pixel 21 (i.e., photoelectric conversion element 210). Accordingly, the event can also be said to be a change in a light amount (change in luminance) of the pixel 21 exceeding a predetermined threshold. The event data indicating the occurrence of an event includes at least positional information such as coordinates indicating a position of the pixel 21 at which the change in the light amount as the event has occurred, i.e., the X-Y address information. The event data can include a polarity of the change in the light amount, in addition to the positional information.

It can be said that, as for a sequence of event data outputted from the pixel 21 at a timing at which an event has occurred, the event data implicitly includes time information indicating relative time at which the event has occurred, as long as an interval between pieces of event data is maintained as it is at the time when the event has occurred.

However, when the interval between the pieces of event data is not maintained anymore as it is at the time when the event has occurred, for example, due to the event data being stored in a memory, the time information implicitly included in the event data is lost. For this reason, the signal processing section 26 includes, in the event data, the time information indicating relative time at which the event has occurred, such as a time stamp, before the interval between the pieces of event data is not maintained anymore as it is at the time when the event has occurred.

[Circuit Configuration Examples of Pixel]

Subsequently, description is given of a specific circuit configuration example of the pixel 21. The pixel 21 includes the event detection part 211 that detects, as an event, that the change in luminance has exceeded a predetermined threshold.

The pixel 21 detects presence or absence of occurrence of an event depending on whether or not a variation in the photocurrent has exceeded a predetermined threshold. The event includes, for example, an ON event indicating that a variation in the photocurrent has exceeded an upper limit threshold, and an OFF event indicating that the variation has fallen below a lower limit threshold. In addition, the event data (event information) indicating the occurrence of an event includes, for example, one bit indicating a result of detection of the ON event and one bit indicating a result of detection of the OFF event. It is to be noted that the pixel 21 may be configured to have a function of detecting only the ON event, or may be configured to have a function of detecting only the OFF event.

Circuit Configuration Example 1

The circuit configuration example 1 is an example in which one comparator is used to perform the ON event detection and the OFF event detection by means of time division. FIG. 4 illustrates a circuit diagram of the pixel 21 according to the circuit configuration example 1. The pixel 21 according to the circuit configuration example 1 has a circuit configuration including, as the address event detection part 211, a light-receiving circuit 212, a memory capacity 213, a comparator 214, a reset circuit 215, an inverter 216, and an output circuit 217, in addition to the photoelectric conversion element 210.

Under the control of the sensor control section 23, the pixel 21 of the above-described circuit configuration detects the ON event and the OFF event. Here, the ON event is an event indicating that the variation in the photocurrent has exceeded the upper limit threshold, and the OFF event is an event indicating that the variation in the photocurrent has fallen below the lower limit threshold.

The photoelectric conversion element 210 includes a first electrode (anode electrode) coupled to an input end of the light-receiving circuit 212, and a second electrode (cathode electrode) coupled to a ground node, which is a reference potential node; the photoelectric conversion element 210 photoelectrically converts incident light to generate electric charges in a charge amount corresponding to light intensity (light amount). In addition, the photoelectric conversion element 210 converts the generated electric charges into a photocurrent Iphoto.

The light-receiving circuit 212 converts the photocurrent Iphoto corresponding to light intensity (light amount) detected by the photoelectric conversion element 210 into a voltage Vpr. Here, a relationship of the voltage Vpr with respect to the light intensity is typically a logarithmic relationship. That is, the light-receiving circuit 212 converts the photocurrent Iphoto corresponding to the intensity of light to be irradiated to a light-receiving surface of the photoelectric conversion element 210 into the voltage Vpr which is a logarithmic function. However, the relationship between the photocurrent Iphoto and the voltage Vpr is not limited to the logarithmic relationship.

The voltage Vpr corresponding to the photocurrent Iphoto outputted from the light-receiving circuit 212 passes through the memory capacity 213, and thereafter serves as a voltage Vdiff to be an inverting (−) input which is a first input of the comparator 214. The comparator 214 is typically configured by differential pair transistors. The comparator 214 sets a threshold voltage Vb given from the sensor control section 23 as a non-inverting (+) input which is a second input to perform the ON event detection and the OFF event detection by means of time division. In addition, after the ON event/OFF event detection, the pixel 21 is reset by the reset circuit 215.

The sensor control section 23 outputs, by means of time division, as the threshold voltage Vb, a voltage Von at a stage of detecting the ON event, outputs a voltage Voff at a stage of detecting the OFF event, and outputs a voltage Vreset at a stage of resetting. The voltage Vreset is set to a value between the voltage Von and the voltage Voff, preferably, to an intermediate value between the voltage Von and the voltage Voff. Here, the term "intermediate value" means not only a case of strictly an intermediate value but also a case of substantially an intermediate value, and the presence of various types of dispersion occurring in designing or manufacturing is allowed.

In addition, the sensor control section 23 outputs, to the pixel 21, an On selection signal at the stage of detecting the ON event, outputs an Off selection signal at the stage of detecting the OFF event, and outputs a global reset signal at the stage of resetting. The On selection signal is given to a selection switch SWon, as a control signal therefor, provided between the inverter 216 and the output circuit 217. The Off selection signal is given to a selection switch SWoff, as a control signal therefor, provided between the comparator 214 and the output circuit 217.

At the stage of detecting the ON event, the comparator 214 compares the voltage Von and the voltage Vdiff with each other, and, when the voltage Vdiff has exceeded the voltage Von, outputs, as the comparison result, ON event information On indicating that a variation in the photocurrent Iphoto has exceeded an upper limit threshold. The ON event information On is inverted by the inverter 216, and thereafter supplied to the output circuit 217 through the selection switch SWon.

At the stage of detecting the OFF event, the comparator 214 compares the voltage Voff and the voltage Vdiff with each other, and, when the voltage Vdiff has fallen below the voltage Voff, outputs, as the comparison result, OFF event information Off indicating that the variation in the photocurrent Iphoto has fallen below a lower limit threshold. The OFF event information Off is supplied to the output circuit 217 through the selection switch SWoff.

The reset circuit 215 has a configuration including a reset switch SWRS, a two-input OR circuit 2151, and a two-input AND circuit 2152. The reset switch SWRS is coupled between the inverting (−) input terminal and an output terminal of the comparator 214, and is brought into an ON (closed) state to thereby selectively short-circuit the inverting input terminal and the output terminal to each other.

The OR circuit 2151 has, as two inputs, the ON event information On through the selection switch SWon and the OFF event information Off through the selection switch SWoff. The AND circuit 2152 has an output signal of the OR circuit 2151 as one input, and a global reset signal, as the other input, given by the sensor control section 23. When one of the ON event information On or the OFF event information Off is detected and the global reset signal is in an active state, the reset switch SWRS is brought into an ON (closed) state.

In this manner, bringing an output signal of the AND circuit 2152 into an active state causes the reset switch SWRS to short-circuit the inverting input terminal and the output terminal of the comparator 214 to each other to perform global reset on the pixel 21. This allows a reset operation to be performed only on the pixel 21 in which an event is detected.

The output circuit 217 has a configuration including an OFF event output transistor NM1, an ON event output transistor NM2 and, a current source transistor NM3. The OFF event output transistor NM1 includes, at a gate part thereof, a memory (unillustrated) to hold the OFF event information Off. This memory includes a gate parasitic capacitance of the OFF event output transistor NM1.

Similarly to the OFF event output transistor NM1, the ON event output transistor NM2 includes, at a gate part thereof, a memory (unillustrated) to hold the ON event information On. This memory includes a gate parasitic capacitance of the ON event output transistor NM2.

At a reading stage, the OFF event information Off held in the memory of the OFF event output transistor NM1 and the ON event information On held in the memory of the ON event output transistor NM2 are transferred to the signal processing section 26 through an output line nRxOff and an output line nRxOn for each pixel row of the pixel array section 22 by giving a row selection signal to a gate electrode of the current source transistor NM3 from the sensor control section 23.

As described above, the pixel 21 according to the circuit configuration example 1 has a configuration of having an event detection function in which one comparator 214 is used to perform the ON event detection and the OFF event detection by means of time division under the control of the sensor control section 23.

Circuit Configuration Example 2

A circuit configuration example 2 is an example in which two comparators are used to perform the ON event detection and the OFF event detection in parallel (simultaneously). FIG. 5 illustrates a circuit diagram of the pixel 21 according to the circuit configuration example 2.

As illustrated in FIG. 5, the pixel 21 according to the circuit configuration example 2 has a configuration including a comparator 214A to detect an ON event, and a comparator 214B to detect an OFF event. In this manner, performing event detection using the two comparators 214A and 214B makes it possible to execute an ON event detection operation and an OFF event detection operation in parallel. As a result, it is possible to implement faster operations of the ON event and OFF event detection operations.

The comparator 214A for the ON event detection is typically configured by differential pair transistors. The comparator 214A sets the voltage Vdiff corresponding to the photocurrent Iphoto as the non-inverting (+) input which is a first input, sets the voltage Von as the threshold voltage Vb as the inverting (−) input which is a second input, and outputs the ON event information On as the result of the comparison therebetween. The comparator 214B for the OFF event detection is also typically configured by differential pair transistors. The comparator 214B sets, as the inverting input being a first input, the voltage Vdiff corresponding to the photocurrent Iphoto, sets, as the non-inversion input being a second input, the voltage Voff as the threshold voltage Vb, and outputs the OFF event information Off as the result of the comparison therebetween.

A selection switch SWon is coupled between an output terminal of the comparator 214A and a gate electrode of the ON event output transistor NM2 of the output circuit 217. A selection switch SWoff is coupled between an output terminal of the comparator 214B and a gate electrode of the OFF event output transistor NM1 of the output circuit 217. The selection switch SWon and the selection switch SWoff are controlled to be turned ON (closed)/OFF (open) by a sample signal outputted from the sensor control section 23.

The ON event information On, which is the result of the comparison by the comparator 214A, is held in a memory of the gate part of the ON event output transistor NM2 via the selection switch SWon. The memory to hold the ON event information On includes a gate parasitic capacitance of the ON event output transistor NM2. The ON event Off, which is the result of the comparison by the comparator 214B, is held in a memory of the gate part of the OFF event output transistor NM1 via the selection switch SWoff. The memory to hold the ON event Off includes a gate parasitic capacitance of the OFF event output transistor NM1.

The ON event information On held in the memory of the ON event output transistor NM2 and the OFF event information Off held in the memory of the OFF event output transistor NM1 are transferred to the signal processing section 26 through the output line nRxOn and the output line nRxOff for each pixel row of the pixel array section 22 by giving a row selection signal to the gate electrode of the current source transistor NM3 from the sensor control section 23.

As described above, the pixel 21 according to the circuit configuration example 2 has the configuration of having an event detection function in which the two comparators of the comparator 214A and the comparator 214B are used to perform the ON event detection and the OFF event detection in parallel (simultaneously) under the control of the sensor control section 23.

Circuit Configuration Example 3

A circuit configuration example 3 is an example in which only the ON event is detected. FIG. 6 illustrates a circuit diagram of the pixel 21 according to the circuit configuration example 3.

The pixel 21 according to the circuit configuration example 3 includes one comparator 214. The comparator 214 sets, as the inverting (−) input being a first input, the voltage Vdiff corresponding to the photocurrent Iphoto, sets, as the non-inverting (+) input being a second input, the voltage Von given as the threshold voltage Vb from a sensor control section 50, and compares them with each other to thereby output the ON event information On as the comparison result. Here, using an N-type transistor as the differential pair transistors constituting the comparator 214 makes it possible to eliminate the need of the inverter 216 used in the circuit configuration example 1 (see FIG. 4).

The ON event information On, which is the result of the comparison by the comparator 214, is held in the memory of the gate part of the ON event output transistor NM2. The memory to hold the ON event information On includes a gate parasitic capacitance of the ON event output transistor NM2. The ON event information On held in the memory of the ON event output transistor NM2 is transferred to the signal processing section 26 through the output line nRxOn for each pixel row of the pixel array section 22 by giving a row selection signal to the gate electrode of the current source transistor NM3 from the sensor control section 23.

As described above, the pixel 21 according to the circuit configuration example 3 has the configuration of having an event detection function in which one comparator 214 is used to detect only the ON event information On under the control of the sensor control section 23.

Circuit Configuration Example 4

A circuit configuration example 4 is an example of detecting only the OFF event. FIG. 7 illustrates a circuit diagram of the pixel 21 according to the circuit configuration example 4.

The pixel 21 according to the circuit configuration example 4 has one comparator 214. The comparator 214 sets, as the inverting (−) input being a first input, the voltage Vdiff corresponding to the photocurrent Iphoto, sets, as the non-inverting (+) input being a second input, the voltage Voff given as the threshold voltage Vb from the sensor control section 23, and compares them with each other to thereby output the OFF event information Off as the comparison result. It may be possible to use a P-type transistor as the differential pair transistors constituting the comparator 214.

The OFF event information Off, which is the result of the comparison by the comparator 214, is held in the memory of the gate part of the OFF event output transistor NM1. The memory holding the OFF event information Off includes a gate parasitic capacitance of the OFF event output transistor NM1. The OFF event information Off held in the memory of the OFF event output transistor NM1 is transferred to the signal processing section 26 through the output line nRxOff for each pixel row of the pixel array section 22 by giving a row selection signal to the gate electrode of the current source transistor NM3 from the sensor control section 23.

As described above, the pixel 21 according to the circuit configuration example 4 has the configuration of having an event detection function in which one comparator 214 is used to detect only the OFF event information Off under the control of the sensor control section 23. It is to be noted that, in the circuit configuration in FIG. 10, the reset switch SWRS is controlled by the output signal of the AND circuit 2152, but a configuration may also be adopted in which the reset switch SWRS is directly controlled by the global reset signal.

[Configuration Example of Event Detection Sensor Including Synchronous Imaging Device]

The description has been given above by exemplifying the case of using the asynchronous imaging device as the event detection sensor 2, but the event detection sensor 2 is not limited to the asynchronous imaging device; it may also be possible to use a synchronous (scan type) imaging device.

FIG. 8 is a block diagram illustrating an example of a configuration of the event detection sensor including the synchronous imaging device. In comparison with the event detection sensor 2 including the asynchronous imaging device illustrated in FIG. 3, the DVS sensor unit 20 in the event detection sensor 2 including the synchronous imaging device has a configuration including a column processing section 27 and a row selection section 28 instead of the X-arbiter section 24 and the Y-arbiter section 25.

In addition, in synchronization with a synchronization signal such as a vertical synchronization signal VD or a horizontal synchronization signal HD supplied from the outside, the sensor control section 23 and the row selection section 28 perform control to scan each pixel 21 of the pixel array section 22. Under scanning by the sensor control section 23 and the row selection section 28, the pixel 21 having detected an event outputs event data to the signal processing section 26. In addition, the pixel 21 having detected an event outputs, to the column processing section 27, an analog pixel signal generated by photoelectric conversion.

The column processing section 27 includes, for example, an analog-digital conversion part including a set of analog-digital converters provided for each pixel column of the pixel array section 22. Examples of the analog-digital converter may include a single-slope analog-digital converter, a successive approximation analog-digital converter, a delta-sigma modulation (ΔΣ modulation type) analog-digital converter, and the like.

The column processing section 27 performs, for each pixel column of the pixel array section 22, processing to convert an analog pixel signal outputted from the pixel 21 of the column concerned into a digital signal. The column processing section 27 is also able to perform CDS (Correlated Double Sampling) processing on the digitized pixel signal.

As described above, in the event detection sensor 2 including the synchronous (scan type) imaging device, each pixel 21 of the pixel array section 22 is scanned in synchronization with the synchronization signal such as the vertical synchronization signal VD or the horizontal synchronization signal HD to thereby perform event detection and imaging.

[Configuration Example of Image Sensor]

Next, description is given of a basic configuration of the image sensor 3 in the object recognition system according to the present embodiment. Here, description is given by exemplifying, as the image sensor 3, a CMOS image sensor which is one type of image sensors of an X-Y address system. The CMOS image sensor is an image sensor produced by applying or partially using a CMOS process. However, the image sensor 3 is not limited to the CMOS image sensor.

(Configuration Example of CMOS Image Sensor)

FIG. 9 is a block diagram illustrating an outline of a configuration of the CMOS image sensor which is an example of the image sensor 3 in the object recognition system according to the present embodiment.

The image sensor 3 according to the present example has a configuration including the pixel array section 22 in which the pixels 21 each including a light-receiving section (photoelectric conversion section) are arranged two-dimensionally in a row direction and a column direction, i.e., in matrix, and a peripheral circuit section of the pixel array section 22. Here, the row direction refers to a direction in which pixels 21 in a pixel row are arranged, and the column direction refers to a direction in which pixels 21 in a pixel column are arranged. The pixel 21 generates and accumulates optical electric charges corresponding to an amount of light reception by performing photoelectric conversion.

The image sensor 3 according to the present example is, for example, an RGB sensor in which respective color filters of R (red), G (green), and B (blue) are incorporated in each of pixels 31 of a pixel array section 32. However, the image sensor 3 is not limited to the RGB sensor.

The peripheral circuit section of the pixel array section 32 is configured, for example, by a row selection section 33, a constant current source section 34, an analog-digital conversion section 35, a horizontal transfer scanning section 36, a signal processing section 37, a timing control section 38, and the like.

In the pixel array section 32, pixel drive lines DL (DL1 to DLm) are wired for respective pixel rows along the row direction, with respect to the pixel arrangement in matrix. In addition, vertical signal lines VL (VL1 to VLn) are wired for respective pixel columns along the column direction. The pixel drive line DL transmits a drive signal to perform driving upon reading of a signal from the pixel 31. Although FIG. 9 illustrates the pixel drive line DL as one wiring line, no limitation is made to one wiring line. One end of the pixel drive line DL is coupled to an output end corresponding to each row of the row selection section 33.

Hereinafter, description is given of respective circuit sections of the peripheral circuit section of the pixel array section 32, i.e., the row selection section 33, the constant current source section 34, the analog-digital conversion section 35, the horizontal transfer scanning section 36, the signal processing section 37, and the timing control section 38.

The row selection section 33 is configured by a shift register, an address decoder, and the like, and controls scanning of pixel rows and addresses of the pixel rows upon selection of each pixel 31 of the pixel array section 32. The row selection section 33 generally has a configuration including two scanning systems of a reading scanning system and a sweeping scanning system, although illustration of specific configurations thereof is omitted.

The reading scanning system sequentially selects and scans the pixels 31 of the pixel array section 32 on a row-by-row basis in order to read pixel signals from the pixels 31. The pixel signal read from the pixel 31 is an analog signal. The sweeping scanning system performs sweeping scanning prior to reading scanning, by the time of a shutter speed, on a reading row on which the reading scanning is performed by the reading scanning system.

This sweep scanning by the sweep scanning system allows unnecessary electric charges to be swept from the light-receiving section (photoelectric conversion section) of the pixel 31 in the reading row, thereby resetting the light-receiving section. Then, sweeping (resetting) the unnecessary electric charges by the sweeping scanning system allows a so-called electronic shutter operation to be performed. Here, the electronic shutter operation refers to an operation of discarding optical electric charges of the light-receiving section and newly starting exposure (starting accumulation of optical electric charges).

The constant current source section 34 includes a plurality of current sources I (see FIG. 10), each including, for example, a MOS transistor, coupled to the respective vertical signal lines VL1 to VLn for the respective pixel columns, and supplies bias currents to the respective pixels 31 of a pixel row selected and scanned by the row selection section 33 through the respective vertical signal lines VL1 to VLn.

The analog-digital conversion section 35 includes a set of a plurality of analog-digital converters provided to correspond to pixel columns of the pixel array section 32 (e.g., provided for respective pixel columns). The analog-digital conversion section 35 is a column parallel analog-digital conversion section that converts, into digital signals, analog pixel signals outputted through the respective vertical signal lines VL1 to VLn for the respective pixel columns.

It may be possible to use, as the analog-digital converter in the column parallel analog-digital conversion section 35, a single slope analog-digital converter which is an example of a reference signal comparison analog-digital converter, for example. However, the analog-digital converter is not limited to the single slope analog-digital converter; it may be possible to use a successive approximation analog-digital converter or a delta-sigma modulation ($\Delta\Sigma$ modulation type) analog-digital converter.

This example of the analog-digital converter in the column parallel analog-digital conversion section 35 is applied similarly in the analog-digital converter in the analog-digital conversion section constituting the column processing section 27 (see FIG. 8) of the event detection sensor 2 described earlier.

The horizontal transfer scanning section 36 is configured by a shift register, an address decoder, and the like, and controls scanning of pixel columns and addresses of the pixel columns upon reading of signals of the pixels 31 of the pixel array section 32. Under the control of the horizontal transfer scanning section 36, pixel signals converted into digital signals by the analog-digital conversion section 35 are read to a horizontal transfer line (horizontal output line) 39 in pixel column units.

The signal processing section 37 performs predetermined signal processing on digital pixel signals supplied through the horizontal transfer line 39, and generates two-dimensional image data. For example, the signal processing section 37 performs correction of vertical line defects and point defects, or signal clamping, or performs digital signal processing such as parallel-serial conversion, compression, encoding, addition, averaging, and intermittent operation. The signal processing section 37 outputs the generated image data as an output signal of the present image sensor 3 to a device in the subsequent stage.

On the basis of the vertical synchronization signal VD and the horizontal synchronization signal HD supplied from the outside as well as a master clock MCK (unillustrated), and the like, the timing control section 38 generates various timing signals, clock signals, control signals, and the like. Then, on the basis of these generated signals, the timing control section 38 controls driving of the row selection section 33, the constant current source section 34, the analog-digital conversion section 35, the horizontal transfer scanning section 36, the signal processing section 37, and the like.

Under the control of the timing control section 38, the present image sensor 3 performs imaging in synchronization with a synchronization signal such as the vertical synchronization signal VD. That is, the present image sensor 3 is a synchronous imaging device that performs imaging at a predetermined frame rate, e.g., at a fixed frame rate.

(Circuit Configuration Example of Pixel)

FIG. 10 is a circuit diagram illustrating an example of a circuit configuration of the pixel 31 of the pixel array section 32 in the image sensor 3.

The pixel 31 includes, for example, a photodiode 311 as a photoelectric conversion element. The pixel 31 has a pixel configuration including, in addition to the photodiode 311, a transfer transistor 312, a reset transistor 313, an amplification transistor 314, and a selection transistor 315.

It is to be noted that, although, for example, an N-type MOS transistor is used here as each of four transistors of the transfer transistor 312, the reset transistor 313, the amplification transistor 314, and the selection transistor 315, the combination of electrically-conductive types of the four transistors 312 to 315 exemplified here is merely an example, and no limitation is made to the combination thereof.

As for the pixel 31, a plurality of pixel drive lines are wired, as the pixel drive lines DL described earlier, in common to pixels 31 in the same pixel row. The plurality of pixel drive lines are coupled in pixel row units to output ends corresponding to the respective pixel rows of the row selection section 33. The row selection section 33 appropriately outputs a transfer signal TRG, a reset signal RST, and a selection signal SEL to the plurality of pixel drive lines.

The photodiode 311, of which an anode electrode is coupled to a low potential side power source (e.g., ground), photoelectrically converts received light into optical electric charges (here, photoelectrons) corresponding to a light amount thereof to accumulate the optical electric charges. A cathode electrode of the photodiode 311 is electrically coupled to a gate electrode of the amplification transistor 314 via the transfer transistor 312. Here, a region to which a gate electrode of the amplification transistor 314 is electrically coupled is a floating diffusion (floating diffusion region/impurity diffusion region) FD. The floating diffusion FD is an electric charge voltage conversion part that convert an electric charge to a voltage.

A gate electrode of the transfer transistor 312 is supplied with the transfer signal TRG, of which a high level (e.g., VDD level) is active, from the row selection section 33. The transfer transistor 312 is brought into an ON state in response to the transfer signal TRG to thereby transfer, to the floating diffusion FD, the optical electric charges photoelectrically converted by the photodiode 311 and accumulated in the photodiode 311.

The reset transistor 313 is coupled between a power source line of a power source voltage VDD and the floating diffusion FD. A gate electrode of the reset transistor 313 is supplied with the reset signal RST, of which a high level is active, from the row selection section 33. The reset transistor 313 is brought into an ON state in response to the reset signal RST, and discards electric charges of the floating diffusion FD to a node of the power source voltage VDD to thereby reset the floating diffusion FD.

The amplification transistor 314 includes the gate electrode coupled to the floating diffusion FD and a drain electrode coupled to the power source line of the power source voltage VDD. The amplification transistor 314 serves as an input part of a source follower that reads a signal obtained by the photoelectric conversion at the photodiode 311. The amplification transistor 314 includes a source electrode coupled to the vertical signal line VL via the selection transistor 315. Then, the amplification transistor 314 and the current source I coupled to one end of the vertical signal line VL constitute the source follower that converts the voltage of the floating diffusion FD into a potential of the vertical signal line VL.

The selection transistor 315 includes a drain electrode coupled to the source electrode of the amplification transistor 314 and a source electrode coupled to the vertical signal line VL. A gate electrode of the selection transistor 315 is supplied with the selection signal SEL, of which a high level is active, from the row selection section 33. The selection transistor 315 is brought into an ON state in response to the selection signal SEL to thereby transmit, to the vertical signal line VL, a signal outputted from the amplification transistor 314, with the pixel 31 as a selected state.

It is to be noted that, although a 4 Tr configuration including four transistors (Tr), i.e., the transfer transistor 312, the reset transistor 313, the amplification transistor 314, and the selection transistor 315 is exemplified here as the pixel circuit of the pixel 31, this is not limitative. For example, a 3 Tr configuration may be adopted in which the selection transistor 315 is omitted, and the amplification transistor 314 has the function of the selection transistor 315, or a configuration of a 5 Tr or more may be adopted in which the number of transistors is increased, as necessary.

[Configuration Example of Ranging Sensor]

Next, description is given of a basic configuration of the ranging sensor 4 in the object recognition system according to the present embodiment. The ranging sensor 4 includes, for example, a ToF ranging device (ToF sensor) that measures a distance to a subject by irradiating an object to be recognized (subject) with light and detecting optical time-of-flight until return of the irradiation light reflected by the subject.

(System Configuration)

FIG. 11 is a block diagram illustrating an example of a configuration of the ToF ranging sensor in the object recognition system according to the present embodiment.

The ranging sensor 4 according to the present example includes, in addition to a light source 41 and a light detection unit 42, an AE (Automatic Exposure: autoexposure) control unit 43 that controls exposure on the basis of a signal value outputted by the light detection unit 42, and a ranging unit 44. Then, the ranging sensor 4 according to the present example is able to detect distance information for each pixel of the light detection unit 42 and to obtain a highly accurate range image (Depth Map: depth map) in an imaging frame unit.

The ranging sensor 4 according to the present example is an indirect (Indirect) ToF ranging sensor. The indirect ToF ranging sensor 4, in which pulse light of a predetermined cycle emitted from the light source 41 is reflected by a target to be measured (subject), detects a cycle in which the light detection unit 42 receives the reflected light. Then, measuring optical time-of-flight from a phase difference between light emission cycle and light reception cycle allows for measurement of the distance to the target to be measured.

Under the control of the AE control unit 43, the light source 41 repeats ON/OFF operations in a predetermined cycle to thereby irradiate light toward the target to be measured. As the irradiation light of the light source 41, for example, a near-infrared ray around 850 nm is often used. The light detection unit 42 receives return light of the irradiation light from the light source 41 reflected by the target to be measured to detect distance information for each pixel. The light detection unit 42 outputs RAW image data of a current frame including the distance information detected for each pixel, and light emission/exposure setting information, and supplies them to the AE control unit 43 and the ranging unit 44.

The AE control unit 43 has a configuration including a next-frame light emission/exposure condition calculation section 431 and a next-frame light emission/exposure control section 432. On the basis of the RAW image data of the current frame and the light emission/exposure setting information supplied from the light detection unit 42, the next-frame light emission/exposure condition calculation section 431 calculates a light emission/exposure condition of the next frame. The light emission/exposure condition of the next frame includes light emission time or light emission intensity of the light source 41 upon acquisition of a range image of the next frame, and exposure time of the light detection unit 42. On the basis of the light emission/exposure condition of the next frame calculated by the next-frame light emission/exposure condition calculation section 431, the next-frame light emission/exposure control section 432 controls the light emission time or light emission intensity of the light source 41 of the next frame, and the exposure time of the light detection unit 42.

The ranging unit 44 has a configuration including a range image calculation section 441 that calculates a range image. The range image calculation section 441 performs calculation using the RAW image data of the current frame including the range information detected for each pixel of the light detection unit 42 to thereby calculate the range image, and outputs, to the outside of the ranging sensor 4, the calculated range image as range image information including each information on depth which is depth information of a subject as well as a confidence value which is information on light reception of the light detection unit 42. Here, the range image is, for example, an image in which a distance value (value of depth/depth) on the basis of the distance information detected for each pixel is reflected in the pixel.

(Configuration Example of Light Detection Unit)

Here, description is given of a specific configuration example of the light detection unit 42 with reference to FIG. 12. FIG. 12 is a block diagram illustrating an example of a configuration of the light detection unit 42.

The light detection unit 42 has a stacked chip structure including a sensor chip 421 and a circuit chip 422 stacked on the sensor chip 421. In this stacked chip structure, the sensor chip 421 and the circuit chip 422 are electrically coupled together with a coupling part (unillustrated), such as a via (VIA) or Cu—Cu junction, interposed therebetween. It is to be noted that FIG. 12 illustrates a state where a wiring line of the sensor chip 421 and a wiring line of the circuit chip 422 are electrically coupled together via the coupling part described above.

A pixel array section 423 is formed on the sensor chip 421. The pixel array section 423 includes a plurality of pixels 424 arranged in matrix (in an arrayed manner) in a two-dimensional grid pattern on the sensor chip 421. In the pixel array section 423, each of the plurality of pixels 424 receives incident light (e.g., near-infrared light), and performs photoelectric conversion to output an analog pixel signal. In the pixel array section 423, two vertical signal lines VSL1 and VSL2 are wired for each pixel column. Assuming that the number of pixel columns of the pixel array section 423 is M (M is an integer), (2×M) vertical signal lines VSL in total are wired in the pixel array section 423.

Each of the plurality of pixels 424 includes a first tap A and a second tap B (described later in detail). An analog pixel signal AINP1 based on electric charges of the first tap A of the pixel 424 in a corresponding pixel column is outputted to the vertical signal line VSL1 of the two vertical signal lines VSL1 and VSL2. In addition, an analog pixel signal AINP2 based on electric charges of the second tap B of the pixel 424 in a corresponding pixel column is outputted to the vertical signal line VSL2. The analog pixel signals AINP1 and AINP2 are described later.

A row selection section 425, a column processing section 426, an output circuit section 427, and a timing control section 428 are disposed on the circuit chip 422. The row selection section 425 drives each pixel 424 of the pixel array section 423 in a pixel row unit to cause the pixel 424 to output the pixel signals AINP1 and AINP2. Under the drive of the row selection section 425, the analog pixel signals AINP1 and AINP2 outputted from the pixel 424 in a selected row are supplied to the column processing section 426 through the two vertical signal lines VSL1 and VSL2.

The column processing section 426 has a configuration including, for example, a plurality of analog-digital converters (ADC) 429 provided for respective pixel columns to correspond to the pixel columns of the pixel array section 423. An analog-digital converter 429 performs analog-to-digital conversion processing on the analog pixel signals AINP1 and AINP2 supplied through the vertical signal lines VSL1 and VSL2, and outputs them to the output circuit section 427. The output circuit section 427 performs CDS (Correlated Double Sampling: correlated double sampling) processing, or the like on the digitized pixel signals AINP1 and AINP2 outputted from the column processing section 426, and outputs them to the outside of the circuit chip 422.

The timing control section 428 generates various timing signals, clock signals, control signals, and the like, and, on the basis of these signals, controls driving of the row selection section 425, the column processing section 426, and the output circuit section 427.

(Circuit Configuration Example of Pixel)

FIG. 13 is a circuit diagram illustrating an example of a circuit configuration of the pixel 424 in the light detection unit 42.

The pixel 424 according to the present example includes, for example, a photodiode 341 as a photoelectric conversion element. The pixel 424 has a configuration including, in addition to the photodiode 341, an overflow transistor 342, two transfer transistors 343 and 344, two reset transistors 345 and 346, two floating diffusion layers 347 and 348, two amplification transistors 349 and 350, and two selection transistors 351 and 352. The two floating diffusion layers 347 and 348 correspond to the first and second taps A and B (hereinafter, simply referred to as "taps A and B" in some cases) illustrated in FIG. 3 described earlier.

The photodiode 341 photoelectrically converts received light to generate electric charges. It may be possible for the photodiode 341 to have, for example, a back-illuminated pixel structure to capture light irradiated from a back surface side of a substrate. However, the pixel structure is not limited to the back-illuminated pixel structure; it may also be possible to adopt a front-illuminated pixel structure to capture light irradiated from a front surface side of a substrate.

The overflow transistor 342 is coupled between a cathode electrode of the photodiode 341 and a power source line of the power source voltage VDD, and has a function of resetting the photodiode 341. Specifically, the overflow transistor 342 is brought into an electrically-conductive state in response to an overflow gate signal OFG supplied from a row selection section 35 to thereby sequentially discharge electric charges of the photodiode 341 to the power source line of the power source voltage VDD.

The two transfer transistors 343 and 344 are coupled between the cathode electrode of the photodiode 341 and the respective two floating diffusion layers 347 and 348 (taps A and B). Then, the transfer transistors 343 and 344 are brought into an electrically-conductive state in response to the transfer signal TRG supplied from the row selection section 35 to thereby sequentially transfer electric charges generated by the photodiode 341 to the floating diffusion layers 347 and 348, respectively.

The floating diffusion layers 347 and 348 corresponding to the first and second taps A and B accumulate electric charges transferred from the photodiode 341, make conversion into a voltage signal of a voltage value corresponding to an amount of the electric charges, and generate the analog pixel signals AINP1 and AINP2.

The two reset transistors 345 and 346 are coupled between the respective two floating diffusion layers 347 and 348 and the power source line of the power source voltage VDD. Then, the reset transistors 345 and 346 are brought into an electrically-conductive state in response to the reset signal RST supplied from the row selection section 35 to thereby draw electric charges from the respective floating diffusion layers 347 and 348 and initialize the amount of the electric charges.

The two amplification transistors 349 and 350 are coupled between the power source line of the power source voltage VDD and the respective two selection transistors 351 and 352, and respectively amplify voltage signals converted into voltages from electric charges by the respective floating diffusion layers 347 and 348.

The two selection transistors 351 and 352 are coupled between the respective two amplification transistors 349 and 350 and the respective vertical signal lines VSL1 and VSL2. Then, the selection transistors 351 and 352 are bought into an electrically-conductive state in response to the selection signal SEL supplied from the row selection section 35 to thereby output, as the respective analog pixel signals AINP1 and AINP2, the voltage signals amplified by the respective amplification transistors 349 and 350 to the respective two vertical signal lines VSL1 and VSL2.

The two vertical signal lines VSL 1 and VSL2 are coupled to an input end of one analog-digital converter 429 within the column processing section 426 for each pixel column, and transmit the analog pixel signals AINP1 and AINP2 outputted from the pixel 424 for each pixel column to the analog-digital converter 429.

It is to be noted that the circuit configuration of the pixel 424 is not limited to the circuit configuration exemplified in FIG. 13 as long as the circuit configuration enables generation of the analog pixel signals AINP1 and AINP2 by photoelectric conversion.

Here, description is given of calculation of a distance by the ToF method with reference to FIG. 14. FIG. 14 is an explanatory timing waveform diagram of the calculation of a distance in the ToF ranging sensor 4. The light source 41 and the light detection unit 42 in the ToF ranging sensor 4 operate at timings illustrated in the timing waveform diagram in FIG. 14.

Under the control of the AE control unit 43, the light source 41 irradiates a target to be measured with light only for a predetermined period, e.g., a period of pulse light emission time Tp. The irradiation light emitted from the light source 41 is reflected by the target to be measured and returned. This reflected light (active light) is received by the photodiode 341. The time from the start of irradiation of the target to be measured with the irradiation light to the reception of the reflected light by the photodiodes 341, i.e., the optical time-of-flight is time corresponding to a distance from the ranging sensor 4 to the target to be measured.

In FIG. 13, the photodiode 341 receives reflected light from the target to be measured only for a period of the pulse light emission time Tp from the point in time when the irradiation by the irradiation light is started. At this time, the light received by the photodiode 341 also includes ambient light (ambient light) reflected and scattered by an object, the atmosphere, or the like, in addition to returned reflected light (active light) reflected by a target to be measured to which the light has been irradiated.

Electric charges having been photoelectrically converted by the photodiode 341 are transferred to and accumulated in the tap A (floating diffusion layer 347) upon first reception of light. Then, a signal n0 of a voltage value corresponding to an amount of the electric charges accumulated in the floating diffusion layer 347 is acquired from the tap A. At a point in time when the accumulation timing in the tap A is completed, the electric charges having been photoelectrically converted by the photodiode 341 are transferred to and accumulated in the tap B (floating diffusion layer 348). Then, a signal n1 of a voltage value corresponding to an amount of the electric charges accumulated in the floating diffusion layer 348 is acquired from the tap B.

In this manner, driving the tap A and the tap B to allow phases of the accumulation timing to differ by 180 degrees (driving to cause phases to be completely reversed) allows the signal n0 and the signal n1 to be acquired, respectively. Then, such driving is repeated a plurality of times, and accumulation and counting of the signal n0 and the signal n1 are performed, thereby allowing an accumulation signal N0 and an accumulation signal N1 to be acquired, respectively.

For example, light reception is performed twice per phase, and signals are accumulated four times, i.e., signals of zero degree, 90 degrees, 180 degrees, and 270 degrees are accumulated for the tap A and the tap B, for one pixel 424. On the basis the accumulation signal N0 and the accumulation signal N1 thus acquired, a distance D from the ranging sensor 4 to the target to be measured is calculated.

The accumulation signal N0 and the accumulation signal N1 include components of ambient light (ambient light) reflected and scattered by an object, the atmosphere, or the like, in addition to components of returned reflected light (active light) reflected by the target to be measured. Accordingly, in the above-described operation, the influence of the components of the ambient light (ambient light) is excluded while the component of the reflected light (active light) is left, and thus the signal n2 based on the ambient light is also accumulated and counted, and the accumulation signal N2 of the ambient light component is acquired.

The accumulation signal N0 and the accumulation signal N1 each including the ambient light component thus acquired and the accumulation signal N2 of the ambient light component are used to calculate the distance D from the ranging sensor 4 to the target to be measured by means of arithmetic processing based on the following expressions (1) and (2).

$$\Delta\phi = \frac{N_0 - N_2}{N_0 + N_1 - 2 \cdot N_2} \quad (1)$$

$$D = \frac{c \cdot T_p}{2}\left(1 - \frac{\Delta\phi}{2\pi}\right) \quad (2)$$

In the expressions (1) and (2), D denotes the distance from the ranging sensor 4 to the target to be measured, c denotes light speed, and Tp denotes pulse light emission time.

The range image calculation section 441 illustrated in FIG. 11 uses the accumulation signal N0 and the accumulation signal N1 each including the ambient light component as well as the accumulation signal N2 of the ambient light component to calculate the distance D from the ranging sensor 4 to the target to be measured by means of the arithmetic processing based on the expressions (1) and (2)

mentioned above outputted from the light detection unit 42, and outputs it as range image information. Examples of the range image information may include image information colored with a color having a concentration corresponding to the distance D. It is to be noted that, although, here, the calculated distance D is outputted as the range image information, the calculated distance D may also be outputted as it is as the distance information.

The description has been given hereinabove of the configurations of the event detection sensor 2, the image sensor 3, and the ranging sensor 4 in the object recognition system according to Example 1 with reference to the specific examples. However, this specific example applies similarly to configurations of an event detection sensor, an image sensor, and a ranging sensor of each of Examples described later.

In addition, the object recognition system according to Example 1 has the configuration including both the image sensor 3 and the ranging sensor 4 in addition to the event detection sensor 2, but no limitation is made to this configuration; a configuration including one of the image sensor 3 or the ranging sensor 4 may be adopted. That is, a configuration including at least one of the image sensor 3 or the ranging sensor 4 (image sensor 3 and/or ranging sensor 4) in addition to the event detection sensor 2 may be adopted. This point applies similarly to each of Examples described later.

[Recognition Processing Example in Object Recognition System According to Example 1]

Subsequently, description is given, with reference to a flowchart in FIG. 15, of a flow of an example of recognition processing to be executed under the control of the spiking neural network 1 in the object recognition system according to Example 1.

The spiking neural network 1 acquires event information (e.g., X-Y address information) outputted from the event detection sensor 2 in an operational state (step S11), then processes the acquired event information (step S12), and then detects a motion of an object to be recognized on the basis of a result of the processing of the event information (step S13).

Next, the spiking neural network 1 activates the image sensor 3 and/or the ranging sensor 4 through the system controller 5 (step S14), and then acquires image information outputted from the image sensor 3 and/or three-dimensional image information such as depth information outputted from the ranging sensor 4 (step S15). Next, on the basis of the image information acquired from the image sensor 3 and/or the three-dimensional image information acquired from the ranging sensor 4, the spiking neural network 1 performs recognition processing of the object to be recognized (step S16).

Example 2

Example 2 is a modification example of Example 1, and is an example of providing two spiking neural networks for an event detection sensor, an image sensor, and a ranging sensor. FIG. 16 illustrates an example of a system configuration of an object recognition system according to Example 2.

[System Configuration]

As illustrated in FIG. 16, the object recognition system according to Example 2 has a configuration in which two spiking neural networks, i.e., a first spiking neural network 1A and a second spiking neural network 1B are provided for three sensors of the event detection sensor 2, the image sensor 3, and the ranging sensor 4.

The first spiking neural network 1A performs recognition processing on the basis of event information outputted from the event detection sensor 2. The second spiking neural network 1B performs recognition processing on the basis of image information outputted from the image sensor 3 and/or three-dimensional image information such as depth information outputted from the ranging sensor 4.

In this manner, by separately providing the first spiking neural network 1A that performs recognition processing on the basis of the event information from the event detection sensor 2 and the second spiking neural network 1B that performs recognition processing on the basis of the image information from the image sensor 3 and/or the three-dimensional image information from the ranging sensor 4, it is possible to use the second spiking neural network 1B to address digital processing and to use the first spiking neural network 1A to address analog processing.

That is, in the case of the object recognition system according to Example 1, there is constraint that the event information outputted from the event detection sensor 2 is digital information. However, in the case of the object recognition system according to Example 2, there is no such constraint; the event information outputted from the event detection sensor 2 may be digital information, or may be analog information.

[Recognition Processing Example in Object Recognition System According to Example 2]

Subsequently, description is given, with reference to a flowchart in FIG. 17, of a flow of an example of recognition processing to be executed under the control of the first spiking neural network 1A and the second spiking neural network 1B in the object recognition system according to Example 2.

The first spiking neural network 1A acquires event information (e.g., X-Y address information) outputted from the event detection sensor 2 in an operational state (step S21), then processes the acquired event information (step S22), and then recognizes significant event information on the basis of a result of the processing of the event information (step S23); then the first spiking neural network 1A activates the image sensor 3 and/or the ranging sensor 4 through the system controller 5 (step S24).

Next, the second spiking neural network 1B acquires image information outputted from the image sensor 3 and/or three-dimensional image information such as depth information outputted from the ranging sensor 4 (step S25), and then performs recognition processing on an object to be recognized on the basis of the image information acquired from the image sensor 3 and/or the three-dimensional image information acquired from the ranging sensor 4 (step S26).

Example 3

Example 3 is a modification example of Example 1, and is an example of providing a spiking neural network for each of an event detection sensor, an image sensor, and a ranging sensor. FIG. 18 illustrates an example of a system configuration of an object recognition system according to Example 3.

[System Configuration]

As illustrated in FIG. 18, the object recognition system according to Example 3 has a configuration in which the first spiking neural network 1A, the second spiking neural network 1B, and a third spiking neural network 1C are provided separately for the event detection sensor 2, the image sensor 3, and the ranging sensor 4, respectively.

The first spiking neural network 1A performs recognition processing on the basis of event information outputted from the event detection sensor 2. The second spiking neural network 1B performs recognition processing on the basis of image information outputted from the image sensor 3. The third spiking neural network 1C performs recognition processing on the basis of three-dimensional image information such as depth information outputted from the ranging sensor 4.

In this manner, by providing the first spiking neural network 1A, the second spiking neural network 1B, and the third spiking neural network 1C separately for the event detection sensor 2, the image sensor 3, and the ranging sensor 4, respectively, it is possible to configure the networks (1A, 1B, and 1C) to be optimum, respectively, for processing of the event information from the event detection sensor 2, processing of the image information from the image sensor 3, and processing for the three-dimensional image information from the ranging sensor 4.

In addition, similarly to the case of the object recognition system according to Example 2, there is no such constraint that the event information outputted from the event detection sensor 2 is digital information, and thus the event information may be digital information, or may be analog information.

[Recognition Processing Example in Object Recognition System according to Example 3]

Subsequently, description is given, with reference to a flowchart in FIG. 19, of a flow of an example of recognition processing to be executed under the control of the first spiking neural network 1A, the second spiking neural network 1B, and the third spiking neural network 1C in the object recognition system according to Example 3.

The first spiking neural network 1A acquires event information (e.g., X-Y address information) outputted from the event detection sensor 2 in an operational state (step S31), then processes the acquired event information (step S32), and then recognizes significant event information on the basis of a result of the processing of the event information (step S33).

Next, the first spiking neural network 1A activates the image sensor 3 and/or the ranging sensor 4 through the system controller 5 (step S34). Next, the second spiking neural network 1B and/or the third spiking neural network 1C acquire image information outputted from the image sensor 3 and/or three-dimensional image information such as depth information outputted from the ranging sensor 4 (step S35), and then performs recognition processing on an object to be recognized on the basis of the image information acquired from the image sensor 3 and/or the three-dimensional image information acquired from the ranging sensor 4 (step S36).

Example 4

Example 4 is an example of using a convolutional neural network in addition to the spiking neural network. The convolutional neural network (CNN: Convolutional Neural Networks) is a neural network having multiple stages of deep layers, and in particular, is a network that exhibits superior performance in the field of image recognition. FIG. 20 illustrates an example of a system configuration of an object recognition system according to Example 4.

[System Configuration]

As illustrated in FIG. 20, the object recognition system according to Example 4 has a configuration including a convolutional neural network 7 as a neural network that performs recognition processing, in addition to the spiking neural network 1.

The spiking neural network 1 performs recognition processing on the basis of event information outputted from the event detection sensor 2, whereas the convolutional neural network 7 performs recognition processing on the basis of image information outputted from the image sensor 3 and/or three-dimensional image information such as depth information outputted from the ranging sensor 4.

In this manner, the object recognition system according to Example 4 that uses the convolutional neural network 7 to perform the recognition processing based on the image information from the image sensor 3 and/or the three-dimensional image information from the ranging sensor 4 also achieves workings and effects similar to those of the object recognition system according to Example 2 that uses the spiking neural network 1B to perform the recognition processing.

[Recognition Processing Example in Object Recognition System According to Example 4]

Subsequently, description is given, with reference to a flowchart in FIG. 21, of a flow of an example of recognition processing to be executed under the control of the spiking neural network 1 and the convolutional neural network 7 in the object recognition system according to Example 4.

The spiking neural network 1 acquires event information (e.g., X-Y address information) outputted from the event detection sensor 2 in an operational state (step S41), then processes the acquired event information (step S42), and then recognizes significant event information on the basis of a result of the processing of the event information (step S43).

Next, the spiking neural network 1 activates the image sensor 3 and/or the ranging sensor 4 through the system controller 5 (step S44). Next, the convolutional neural network 7 acquires image information outputted from the image sensor 3 and/or three-dimensional image information such as depth information outputted from the ranging sensor 4 (step S45), and then performs recognition processing on an object to be recognized on the basis of the image information acquired from the image sensor 3 and/or the three-dimensional image information acquired from the ranging sensor 4 (step S46).

Example 5

Example 5 is a modification example of Example 4, and is an example of controlling a threshold (event detection threshold) of the event detection sensor 2. FIG. 22 is a flowchart illustrating a flow of an example of threshold control of the event detection sensor 2 according to Example 5.

The spiking neural network 1 acquires event information (e.g., X-Y address information) outputted from the event detection sensor 2 in an operational state (step S51), then processes the acquired event information (step S52), and then determines whether or not significant event information is found on the basis of a result of the processing of the event information (step S53).

In a case where no significant event information is found (NO in S53), the spiking neural network 1 returns to step S51, and in a case where significant event information is found (YES in S53), the spiking neural network 1 determines whether or not the number of events at the periphery of a pixel having outputted the significant event information is less than a predetermined threshold (step S54).

In a case where determination is made that the number of the events at the periphery of the pixel having outputted the significant event information is less than the predetermined threshold (YES in S54), the spiking neural network 1 performs control to decrease the event detection threshold of the event detection sensor 2 through the system controller 5 (step S55), and then returns to step S54.

In a case where determination is made that the number of the events at the periphery of the pixel having outputted the significant event information is not less than the predetermined threshold (NO in S54), the spiking neural network 1 subsequently determines whether or not the number of the events at the periphery of the pixel having outputted the significant event information is more than the predetermined threshold (step S56); in a case where determination is made that the number of the events is more than the predetermined threshold (YES in S56), the spiking neural network 1 performs control to increase the event detection threshold of the event detection sensor 2 through the system controller 5 (step S57), and then returns to step S56. Next, the spiking neural network 1 activates the image sensor 3 and/or the ranging sensor 4 through the system controller 5 (step S58).

Next, the convolutional neural network 7 acquires image information outputted from the image sensor 3 and/or three-dimensional image information outputted from the ranging sensor 4 (step S59), and then performs recognition processing on an object to be recognized on the basis of the image information acquired from the image sensor 3 and/or the three-dimensional image information acquired from the ranging sensor 4 (step S60).

It is to be noted that, the control example of the event detection threshold according to the foregoing Example 5 has been described as the control example of the object recognition system according to Example 4 using the convolutional neural network 7, but may also be the control example of the object recognition system according to Example 2 using the second spiking neural network 1B instead of the convolutional neural network 7. In this case, it follows that each processing in step S59 and step S60 is processing by the second spiking neural network 1B.

Example 6

Example 6 is a modification example of Example 4, and is an example of controlling an event rate of a specific region of the event detection sensor 2. FIG. 23 is a flowchart illustrating a flow of an example of threshold control of the event detection sensor 2 according to Example 6.

The spiking neural network 1 acquires event information (e.g., X-Y address information) outputted from the event detection sensor 2 in an operational state (step S61), then processes the acquired event information (step S62), and then determines whether or not significant event information is found on the basis of a result of the processing of the event information (step S63).

In a case where no significant event information is found (NO in S63), the spiking neural network 1 returns to step S61, and in a case where significant event information is found (YES in S63), the spiking neural network 1 sets a region of a pixel group (specific region) having outputted the significant event information as a region of interest (ROI: Region Of Interest) (step S64).

Next, the spiking neural network 1 increases an event rate (event detection frequency) of a portion of the ROI through the system controller 5 to thereby improve sensitivity (step S65), and then activates the image sensor 3 and/or the ranging sensor 4 through the system controller 5 (step S66).

Next, the convolutional neural network 7 acquires image information outputted from the image sensor 3 and/or three-dimensional image information outputted from the ranging sensor 4 (step S67), and then performs recognition processing on an object to be recognized on the basis of the image information acquired from the image sensor 3 and/or the three-dimensional image information acquired from the ranging sensor 4 (step S68).

It is to be noted that, the control example of the event rate according to the foregoing Example 6 has been described as the control example of the object recognition system according to Example 4 using the convolutional neural network 7, but may also be the control example of the object recognition system according to Example 2 using the second spiking neural network 1B instead of the convolutional neural network 7. In this case, it follows that each processing in step S67 and step S68 is processing by the second spiking neural network 1B.

In addition, in the control example of the event rate according to the foregoing Example 6, the case is assumed that the event detection sensor 2 includes the asynchronous imaging device; however, in a case where the event detection sensor 2 includes the synchronous (scan type) imaging device, increasing a scan rate of the specific region (ROI) in the processing in step S65 makes it possible to improve the sensitivity.

Example 7

Example 7 is a modification example of Example 4, and is an example of controlling an event rate of a specific region of the event detection sensor 2 as well as a frame rate of the image sensor 3 and/or the ranging sensor 4. FIG. 24 is a flowchart illustrating a flow of an example of threshold control of the event detection sensor 2 according to Example 6.

The spiking neural network 1 acquires event information (e.g., X-Y address information) outputted from the event detection sensor 2 in an operational state (step S71), then processes the acquired event information (step S72), and then determines whether or not significant event information is found on the basis of a result of the processing of the event information (step S73).

In a case where no significant event information is found (NO in S73), the spiking neural network 1 returns to step S71, and in a case where significant event information is found (YES in S73), the spiking neural network 1 sets a region of a pixel group (specific region) having outputted the significant event information as a region of interest (ROI) (step S74).

Next, the spiking neural network 1 increases an event rate (event detection frequency) of a portion of the ROI through the system controller 5 to thereby improve sensitivity (step S75), then activates the image sensor 3 and/or the ranging sensor 4 through the system controller 5 (step S76), and then increases a frame rate of the image sensor 3 and/or the ranging sensor 4 (step S77).

Next, the convolutional neural network 7 acquires image information outputted from the image sensor 3 and/or three-dimensional image information outputted from the ranging sensor 4 (step S78), and then performs recognition processing on an object to be recognized on the basis of the image information acquired from the image sensor 3 and/or the three-dimensional image information acquired from the ranging sensor 4 (step S79).

It is to be noted that, the control example of the event rate according to the foregoing Example 6 has been described as the control example of the object recognition system according to Example 4 using the convolutional neural network 7, but may also be the control example of the object recognition system according to Example 2 using the second spiking neural network 1B instead of the convolutional neural network 7. In this case, it follows that each processing in step S78 and step S79 is processing by the second spiking neural network 1B.

In addition, in the control example of the event rate according to the foregoing Example 6, the case is assumed that the event detection sensor 2 includes the asynchronous imaging device; however, in a case where the event detection sensor 2 includes the synchronous (scan type) imaging device, increasing a scan rate of the specific region (ROI) in the processing in step S65 makes it possible to improve the sensitivity.

Example 8

Example 8 is an example of controlling a light source used in the ranging sensor 4 or the like. FIG. 25 illustrates an example of a system configuration of an object recognition system according to Example 8.
[System Configuration]
As illustrated in FIG. 25, the object recognition system according to Example 8 includes a light source 8, and is configured to control the light source 8 through the system controller 5 under the control of the spiking neural network 1. The light source 8 corresponds to the light source 41 (see FIG. 11) used in the ToF ranging sensor 4, for example.

When detecting a subject upon reception of event information from the event detection sensor 2, the spiking neural network 1 controls the light source 8 to irradiate a specific region of the subject in order to acquire information on the specific region of the subject by the image sensor 3 and/or the ranging sensor 4. As an example, when the subject is a human face, the spiking neural network 1 controls the light source 8 to irradiate a portion of the face for face authentication, for example.
[Recognition Processing Example in Object Recognition System According to Example 8]
Subsequently, description is given, with reference to a flowchart in FIG. 26, of a flow of an example of recognition processing to be executed under the control of the spiking neural network 1 and the convolutional neural network 7 in the object recognition system according to Example 8.

The spiking neural network 1 acquires event information (e.g., X-Y address information) outputted from the event detection sensor 2 in an operational state (step S81), then processes the acquired event information (step S82), and then determines whether or not significant event information is found on the basis of a result of the processing of the event information (step S83).

In a case where no significant event information is found (NO in S83), the spiking neural network 1 returns to step S81, and in a case where significant event information is found (YES in S83), the spiking neural network 1 sets a region of a pixel group (specific region) having outputted the significant event information as a region of interest (ROI) (step S84).

Next, the spiking neural network 1 increases an event rate (event detection frequency) of a portion of the ROI through the system controller 5 to thereby improve sensitivity (S85). Next, the spiking neural network 1 controls the light source 8 through the system controller 5 to intensively irradiate the portion of the ROI with light (step S86), and then activates the image sensor 3 and/or the ranging sensor 4 through the system controller 5 (step S87).

Next, the convolutional neural network 7 acquires image information outputted from the image sensor 3 and/or three-dimensional image information outputted from the ranging sensor 4 (step S88), and then performs recognition processing on an object to be recognized on the basis of the image information acquired from the image sensor 3 and/or the three-dimensional image information acquired from the ranging sensor 4 (step S89).

It is to be noted that, the object recognition system according to the foregoing Example 8 is configured to use the convolutional neural network 7 similarly to the object recognition system according to Example 4, but may also employ the spiking neural network 1B similarly to the object recognition system according to Example 2. In this case, it follows that, in the control example illustrated in FIG. 26, each processing in step S88 and step S89 is processing by the spiking neural network 1B.

Example 9

Example 9 is a pixel arrangement example in a case where ON pixels and OFF pixels are present in a mixed manner within the pixel array section 22 in the event detection sensor 2. Here, the "ON pixel" is the pixel 21 according to the circuit configuration example 3 illustrated in FIG. 6, i.e., a first pixel having a function of detecting only the ON event. In addition, the "OFF pixel" is the pixel 21 according to the circuit configuration example 4 illustrated in FIG. 7, i.e., a second pixel having a function of detecting only the OFF event.

FIGS. 27A and 27B each illustrate a pixel arrangement example (No. 1) of the ON pixels and the OFF pixels according to Example 9, and FIGS. 28A and 28B each illustrate a pixel arrangement example (No. 2). Here, for simplicity of drawings, there are illustrated pixel arrangements (pixel arrays) of 16 pixels in total of four pixels in an X-direction (row direction/horizontal direction)×four pixels in a Y-direction (column direction/vertical direction).

The pixel arrangement illustrated in FIG. 27A has a configuration in which the ON pixels and the OFF pixels are alternately arranged in both the X-direction and the Y-direction. The pixel arrangement illustrated in FIG. 27B has a configuration in which four pixels in total of two pixels in the X-direction×two pixels in the Y-direction are set as a block (unit), and the blocks of the ON pixels and the blocks of the OFF pixels are alternately arranged in both the X-direction and the Y-direction.

The pixel arrangement illustrated in FIG. 28A has an arrangement configuration in which, among 16 pixels in total, four pixels at the middle are set as OFF pixels, and 12 pixels therearound are set as ON pixels. The pixel arrangement illustrated in FIG. 28B has an arrangement configuration in which, pixels in odd columns and even rows are set as ON pixels, and the remaining pixels are set as OFF pixels, in the pixel arrangement of 16 pixels in total.

It is to be noted that each of the pixel arrangements of the ON pixels and the OFF pixels exemplified here is merely an example, and no limitation is made to such pixel arrangements.

Example 10

Example 10 is a sensor arrangement example in a case where DVS sensors being an example of the event detection sensor 2, the RGB sensors being an example of the image sensor 3, and the ToF sensors being an example of the ranging sensor 4 are present in a mixed manner.

FIG. 29A illustrates a sensor arrangement example in a case where the DVS sensors and the ToF sensors are present in a mixed manner, and FIG. 29B illustrates a sensor arrangement example in a case where the DVS sensors and the RGB sensors are present in a mixed manner Here, for simplicity of drawings, there are illustrated sensor arrangements of 16 sensors in total of four sensors in the X-direction×four sensors in the Y-direction.

The sensor arrangement illustrated in FIG. 29A has a configuration in which 16-sensor regions in total are divided into four equal portions, the DVS sensors are arranged in a checkered pattern with four-sensor regions being used as a unit, and the ToF sensors are arranged in the remaining four-sensor regions with one-sensor region being used as a unit.

The sensor arrangement illustrated in FIG. 29B has a configuration in which 16-sensor regions in total are divided into four equal portions, the DVS sensors are arranged in a checkered pattern with four-sensor regions being used as a unit, and the RGB sensors are arranged in the remaining four-sensor regions. The RGB sensor has a configuration in which G (green) filters are arranged in a checkered pattern with one-sensor region being used as a unit, and an R (red) filter and a B (blue) filter are arranged in the remaining two-sensor regions.

Modification Example

Although the description has been given hereinabove of the technology of the present disclosure on the basis of the preferred embodiments, the technology of the present disclosure is not limited to the foregoing embodiments. The configuration and structure of the ranging device described in each of the foregoing embodiments are exemplary, and may be modified as appropriate.

<Electronic Apparatus of Present Disclosure>

The object recognition system of the present disclosure described hereinabove is usable, for example, as a face authentication system (three-dimensional image acquisition system) to be mounted on various electronic apparatuses each having a face authentication function. Examples of the electronic apparatus having the face authentication function include mobile apparatuses such as a smartphone, a tablet, and a personal computer.

However, the electronic apparatus for which the object recognition system of the present disclosure is usable is not limited to the above-mentioned mobile apparatuses, but is usable for various devices each having a function of recognizing an object. In addition to the mobile apparatuses, as an example, the object recognition system of the present disclosure is applicable to a driver monitor to be installed in a vehicle in order to observe a driver of the vehicle and prevent a driver from dozing off or from looking aside while driving, for example. Hereinafter, a smartphone is exemplified as an electronic apparatus that uses the object recognition system of the present disclosure.

[Example of Smartphone]

FIG. 30 illustrates an external view of a smartphone according to an example of the electronic apparatus of the present disclosure, as viewed from a front side. A smartphone 100 according to the present example includes a display unit 120 on the front side of a housing 110. It may be possible to mount the smartphone 100 with the above-described object recognition system according to an embodiment of the present disclosure for use.

Specifically, the spiking neural network 1, the system controller 5, and the application processor 6 are housed inside the housing 110, and, for example, the event detection sensor 2, the image sensor 3, and the ranging sensor 4 are disposed at an upper part of the display unit 120. However, the arrangement example of the event detection sensor 2, the image sensor 3, and the ranging sensor 4 are merely exemplary, and no limitation is made to this arrangement example.

As described above, the smartphone 100 according to the present example is mounted with the object recognition system according to an embodiment of the present disclosure for production. In addition, the smartphone 100 according to the present example is mounted with the object recognition system according to an embodiment of the present disclosure, which is able to perform recognition processing at a higher speed. This enables the smartphone 100 according to the present example to have a face authentication function that makes it possible to perform the recognition processing at a higher speed.

Configuration Implementable by Present Disclosure

It is to be noted that the present disclosure may also have the following configurations.

<<A. Object Recognition System>>

[A-1]

An object recognition system including:
 an event detection sensor that detects, as an event, that a change in luminance of a pixel has exceeded a predetermined threshold; and
 a spiking neural network, in which
 the spiking neural network executes recognition processing on an object to be recognized on a basis of a result of the detection by the event detection sensor.

[A-2]

The object recognition system according to [A-1], in which the event detection sensor includes an asynchronous imaging device.

[A-3]

The object recognition system according to [A-1] or [A-2], including at least one sensor of an image sensor that acquires image information on an object to be recognized or a ranging sensor that acquires three-dimensional image information on an object to be recognized.

[A-4]

The object recognition system according to [A-3], in which the image sensor includes a synchronous imaging device that performs imaging at a predetermined frame rate.

[A-5]

The object recognition system according to [A-3], in which the ranging sensor includes a ToF ranging device that irradiates an object to be recognized with light and detects optical time-of-flight until return of the irradiation light reflected by the object to be recognized.

[A-6]

The object recognition system according to [A-3], in which
 the spiking neural network includes
  a first spiking neural network that performs recognition processing on a basis of event information outputted from the event detection sensor, and
  a second spiking neural network that performs recognition processing on a basis of at least one information of the image information outputted from the image sensor or the three-dimensional image information outputted from the ranging sensor.

[A-7]

The object recognition system according to [A-3], in which
the spiking neural network includes
a first spiking neural network that performs recognition processing on a basis of event information outputted from the event detection sensor,
a second spiking neural network that performs recognition processing on a basis of the image information outputted from the image sensor, and
a third spiking neural network that performs recognition processing on a basis of the three-dimensional image information outputted from the ranging sensor.

[A-8]

The object recognition system according to [A-3], including a convolutional neural network that performs recognition processing on a basis of at least one information of the image information outputted from the image sensor or the three-dimensional image information outputted from the ranging sensor.

[A-9]

The object recognition system according to any one of [A-1] to [A-9], in which, in the event detection sensor, an event detection threshold of the event detection sensor is controlled in accordance with the number of events at a periphery of a pixel having outputted significant event information.

[A-10]

The object recognition system according to any one of [A-1] to [A-9], in which, in the event detection sensor, a pixel group having outputted significant event information is set as a region of interest, and an event rate of a portion of the region of interest is increased.

[A-11]

The object recognition system according to any one of [A-1] to [A-9], in which, in the event detection sensor,
a pixel group having outputted significant event information is set as a region of interest, and an event rate of a portion of the region of interest is increased, and
a frame rate of at least one of the image sensor or the ranging sensor is increased.

[A-12]

The object recognition system according to any one of [A-1] to [A-9], including a light source that irradiates an object to be recognized with light, in which, in the event detection sensor,
a pixel group having outputted significant event information is set as a region of interest, and an event rate of a portion of the region of interest is increased, and
the light source is controlled to irradiate the portion of the region of interest with light.

<<B. Electronic Apparatus>>

[B-1]

An electronic apparatus including an electronic apparatus, the electronic apparatus including
an event detection sensor that detects, as an event, that a change in luminance of a pixel has exceeded a predetermined threshold, and
a spiking neural network, in which
the spiking neural network executes recognition processing on an object to be recognized on a basis of a result of the detection by the event detection sensor.

[B-2]

The electronic apparatus according to [B-1], in which the event detection sensor includes an asynchronous imaging device.

[B-3]

The electronic apparatus according to [B-1] or [B-2], including at least one sensor of an image sensor that acquires image information on an object to be recognized or a ranging sensor that acquires three-dimensional image information on an object to be recognized.

[B-4]

The electronic apparatus according to [B-3], in which the image sensor includes a synchronous imaging device that performs imaging at a predetermined frame rate.

[B-5]

The electronic apparatus according to [B-3], in which the ranging sensor includes a ToF ranging device that irradiates an object to be recognized with light and detects optical time-of-flight until return of the irradiation light reflected by the object to be recognized.

[B-6]

The electronic apparatus according to [B-3], in which
the spiking neural network includes
a first spiking neural network that performs recognition processing on a basis of event information outputted from the event detection sensor, and
a second spiking neural network that performs recognition processing on a basis of at least one information of the image information outputted from the image sensor or the three-dimensional image information outputted from the ranging sensor.

[B-7]

The electronic apparatus according to [B-3], in which
the spiking neural network includes
a first spiking neural network that performs recognition processing on a basis of event information outputted from the event detection sensor,
a second spiking neural network that performs recognition processing on a basis of the image information outputted from the image sensor, and
a third spiking neural network that performs recognition processing on a basis of the three-dimensional image information outputted from the ranging sensor.

[B-8]

The electronic apparatus according to [B-3], including a convolutional neural network that performs recognition processing on a basis of at least one information of the image information outputted from the image sensor or the three-dimensional image information outputted from the ranging sensor.

[B-9]

The electronic apparatus according to any one of [B-1] to [B-9], in which, in the event detection sensor, an event detection threshold of the event detection sensor is controlled in accordance with the number of events at a periphery of a pixel having outputted significant event information.

[B-10]

The electronic apparatus according to any one of [B-1] to [B-9], in which, in the event detection sensor, a pixel group having outputted significant event information is set as a region of interest, and an event rate of a portion of the region of interest is increased.

[B-11]

The electronic apparatus according to any one of [B-1] to [B-9], in which, in the event detection sensor, a pixel group having outputted significant event information is set as a region of interest, and an event rate of a portion of the region of interest is increased, and a frame rate of at least one of the image sensor or the ranging sensor is increased.

[B-12]

The electronic apparatus according to any one of [B-1] to [B-9], including a light source that irradiates an object to be recognized with light, in which, in the event detection sensor, a pixel group having outputted significant event information is set as a region of interest, and an event rate of a portion of the region of interest is increased, and the light source is controlled to irradiate the portion of the region of interest with light.

This application claims the benefits of Japanese Priority Patent Application JP2020-072261 filed with the Japan Patent Office on Apr. 14, 2020, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An object recognition system, comprising:
    an event detection sensor configured to detect, as an event, that a change in luminance of a pixel has exceeded a specific threshold;
    an image sensor configured to acquire image information on an object to be recognized;
    a ranging sensor configured to acquire three-dimensional image information on the object to be recognized; and
    a spiking neural network, wherein
        the spiking neural network includes
        a first spiking neural network that executes a recognition process on the object to be recognized based on event information outputted from the event detection sensor,
        a second spiking neural network that executes the recognition process based on the image information outputted from the image sensor, and
        a third spiking neural network that executes the recognition process based on the three-dimensional image information outputted from the ranging sensor.

2. The object recognition system according to claim 1, wherein the event detection sensor includes an asynchronous imaging device.

3. The object recognition system according to claim 1, wherein the image sensor includes a synchronous imaging device configured to execute an imaging operation at a specific frame rate.

4. The object recognition system according to claim 1, wherein
    the ranging sensor includes a Time-of-Flight (ToF) ranging device,
    the ranging sensor is further configured to:
        irradiate an object to be recognized with light, and
        detect optical time-of-flight until return of the irradiated light reflected by the object to be recognized.

5. The object recognition system according to claim 1, further comprising a convolutional neural network that executes the recognition process based on at least one of the image information outputted from the image sensor or the three-dimensional image information outputted from the ranging sensor.

6. The object recognition system according to claim 1, wherein, in the event detection sensor, an event detection threshold of the event detection sensor is controlled based on a number of events at a periphery of a pixel that has outputted significant event information.

7. The object recognition system according to claim 1, wherein, in the event detection sensor,
    a pixel group that has outputted significant event information is set as a region of interest, and
    an event rate of a portion of the region of interest is increased.

8. The object recognition system according to claim 1, wherein, in the event detection sensor,
    a pixel group that has outputted significant event information is set as a region of interest,
    an event rate of a portion of the region of interest is increased, and
    a frame rate of at least one of the image sensor or the ranging sensor is increased.

9. The object recognition system according to claim 1, further comprising a light source configured to irradiate an object to be recognized with light, wherein, in the event detection sensor,
    a pixel group that has outputted significant event information is set as a region of interest,
    an event rate of a portion of the region of interest is increased, and
    the light source is controlled to irradiate the portion of the region of interest with light.

10. An electronic apparatus, comprising;
    an object recognition system,
    the object recognition system including
    an event detection sensor configured to detect, as an event, that a change in luminance of a pixel has exceeded specific threshold,
    an image sensor configured to acquire image information on an object to be recognized,
    a ranging sensor configured to acquire three-dimensional image information on the object to be recognized, and
    a spiking neural network, wherein
    the spiking neural network includes
        a first spiking neural network that executes a recognition process on the object to be recognized based on event information outputted from the event detection sensor,
        a second spiking neural network that executes the recognition process based on the image information outputted from the image sensor, and
        a third spiking neural network that executes the recognition process based on the three-dimensional image information outputted from the ranging sensor.

* * * * *